US012757054B2

(12) United States Patent
Chandrashekar et al.

(10) Patent No.: US 12,757,054 B2
(45) Date of Patent: Oct. 6, 2026

(54) APPARATUS, METHOD, AND COMPUTER PROGRAM

(71) Applicant: Nokia Technologies Oy, Espoo (FI)

(72) Inventors: Subramanya Chandrashekar, Bangalore (IN); Srinivasan Selvaganapathy, Bangalore (IN); Tero Henttonen, Espoo (FI); Karri Markus Ranta-Aho, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 318 days.

(21) Appl. No.: 18/707,638

(22) PCT Filed: Jun. 14, 2022

(86) PCT No.: PCT/EP2022/066109
§ 371 (c)(1),
(2) Date: May 6, 2024

(87) PCT Pub. No.: WO2023/083501
PCT Pub. Date: May 19, 2023

(65) Prior Publication Data

US 2025/0008363 A1 Jan. 2, 2025

(30) Foreign Application Priority Data

Nov. 10, 2021 (IN) ............................ 202141051546

(51) Int. Cl.
*H04W 24/10* (2009.01)
*H04W 88/08* (2009.01)

(52) U.S. Cl.
CPC .......... *H04W 24/10* (2013.01); *H04W 88/085* (2013.01)

(58) Field of Classification Search
None
See application file for complete search history.

(56) References Cited

U.S. PATENT DOCUMENTS

2013/0315075 A1* 11/2013 Tamura ................ H04W 24/10 370/242
2015/0189560 A1 7/2015 Ji
(Continued)

FOREIGN PATENT DOCUMENTS

EP 3826352 A1 5/2021
WO 2023/012646 A1 2/2023

OTHER PUBLICATIONS

Qualcomm Incorporated: "Discussion on LI/L2 Mobility", 3GPP Draft; R2-2103079, 3rd Generation Partnership Project (3GPP), Mobile Competence Centre; 650, Route Des Lucioles; F-06921 Sophia-Antipolis Cedex; France vol. RAN WG2, No. Electronic; Apr. 12, 2021-Apr. 20, 2021 Apr. 2, 2021 (Apr. 2, 2021), XP052174591, Retrieved from the Internet: <URL:https://ftp.3gpp.org/tsg_ran/WG2_RL2/T> SGR2_113bis-e/Docs/R2-2103079.zip R2-2103079_L1L2 Mobility_V2.docx [retrieved on Apr. 2, 2021] the whole.
(Continued)

*Primary Examiner* — Faruk Hamza
*Assistant Examiner* — Cassandra L Decker
(74) *Attorney, Agent, or Firm* — Carter, DeLuca & Farrell LLP

(57) ABSTRACT

An apparatus configured to: receive a first measurement and reporting configuration for at least one first cell of an active set and a second measurement and reporting configuration for at least one second cell of a configured set, wherein the at least one second cell is a target cell and not part of the active set; measure and report the at least one first cell based on the first measurement and reporting configuration; abstain from measuring and reporting the at least one second cell based on the second measurement and reporting configuration; send an indication that an activation condition is met for the at least one second cell; add the at least one second cell to the active set based on a confirmation indication; and measure and report the at least one second cell
(Continued)

based on the second measurement and reporting configuration.

19 Claims, 12 Drawing Sheets

(56) References Cited

U.S. PATENT DOCUMENTS

| | | | | |
|---|---|---|---|---|
| 2021/0105647 | A1 | 4/2021 | Lee | |
| 2022/0264384 | A1 * | 8/2022 | Lee | H04W 36/00835 |
| 2023/0397032 | A1 * | 12/2023 | Yavuz | H04W 36/322 |

OTHER PUBLICATIONS

Xiaomi: "Enhancements on multi-beam operation", 3GPP Draft; RI-2111540, 3rd Generation Partnership Project (3GPP), Mobile Competence Centre; 650, Route Des Lucioles; F-06921 Sophia-Antipolis Cedex; France vol. RAN WGI, No. e-Meeting; Nov. 11, 2021- Nov. 19, 2021 Nov. 5, 2021 (Nov. 5, 2021), XP052179448, Retrieved from the Internet: <URL:https://ftp.3gpp.org/tsg_ran/WG1_RL1/T> SGR1_107-e/Docs/RI-2111540.zip RI-2111540.docx [retrieved on Nov. 5, 2021] the whole document.

International Search Report issued by the European Patent Office acting as the International Searching Authority in relation to International Application No. PCT/EP2022/066109 issued Oct. 13, 2022 (4 pages).

Written Opinion of the International Searching Authority issued by the European Patent Office acting as the International Searching Authority in relation to International Application No. PCT/EP2022/066109 issued Oct. 13, 2022 (12 pages).

"3rd Generation Partnership Project; Technical Specification Group Radio Access Network; NR; Medium Access Control (MAC) protocol specification (Release 16)", 3GPP TS 38.321, V16.6.0, Sep. 2021, pp. 1-158.

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.

"3rd Generation Partnership Project; Technical Specification Group Radio Access Network; NG-RAN; F1 application protocol (F1AP) (Release 16)", 3GPP TS 38.473, V16.7.0, Oct. 2021, pp. 1-464.

"LS on TCI State Update for L1/L2-Centric Inter-Cell Mobility", 3GPP TSG RAN WG1 Meeting #104-e, R1-2102248, RAN1, Samsung, Jan. 25-Feb. 5, 2021, 3 pages.

"New WID: Further Enhancements on MIMO for NR", 3GPP TSG RAN Meeting #86, RP-193133, Agenda: 9.1.1, Samsung, Dec. 9-12, 2019, 5 pages.

"5G/NR—MAC CE", ShareTechnote, Retrieved on Oct. 28, 2025, webpage available at: https://www.sharetechnote.com/html/5G/5G_MAC_CE.html, 5 pages.

Office action received for corresponding European Patent Application No. 22736179.7, dated Oct. 2, 2025, 5 pages.

* cited by examiner

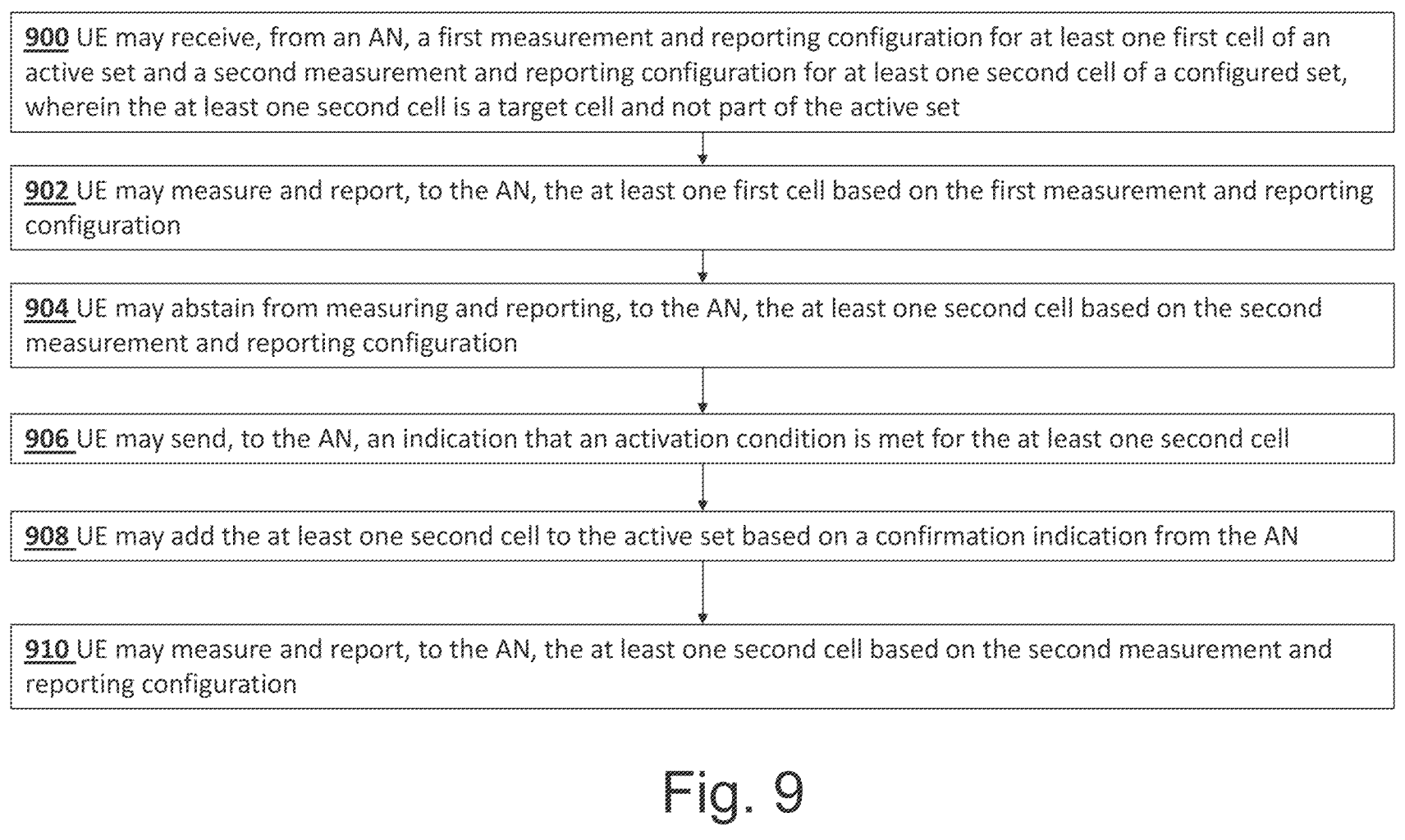

900 UE may receive, from an AN, a first measurement and reporting configuration for at least one first cell of an active set and a second measurement and reporting configuration for at least one second cell of a configured set, wherein the at least one second cell is a target cell and not part of the active set

↓

902 UE may measure and report, to the AN, the at least one first cell based on the first measurement and reporting configuration

↓

904 UE may abstain from measuring and reporting, to the AN, the at least one second cell based on the second measurement and reporting configuration

↓

906 UE may send, to the AN, an indication that an activation condition is met for the at least one second cell

↓

908 UE may add the at least one second cell to the active set based on a confirmation indication from the AN

↓

910 UE may measure and report, to the AN, the at least one second cell based on the second measurement and reporting configuration

Fig. 9

APPARATUS, METHOD, AND COMPUTER PROGRAM

CROSS-REFERENCE TO RELATED APPLICATIONS

This application is a national phase entry under 35 U.S.C. 371 of PCT International Application No. PCT/EP2022/066109 filed Jun. 14, 2022, which claims priority to India patent application Ser. No. 202141051546, filed Nov. 10, 2021, the disclosure of each of these applications is expressly incorporated herein by reference in their entirety.

FIELD OF THE DISCLOSURE

The present disclosure relates to an apparatus, a method, and a computer program for measuring and reporting target cells in a communication system.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising means for: receiving, from an access node, a first measurement and reporting configuration for at least one first cell of an active set and a second measurement and reporting configuration for at least one second cell of a configured set, wherein the at least one second cell is a target cell and not part of the active set; measuring and reporting, to the access node, the at least one first cell based on the first measurement and reporting configuration; abstain from measuring and reporting, to the access node, the at least one second cell based on the second measurement and reporting configuration; sending, to the access node, an indication that an activation condition is met for the at least one second cell; adding the at least one second cell to the active set based on a confirmation indication from the access node; and measuring and reporting, to the access node, the at least one second cell based on the second measurement and reporting configuration.

The apparatus may comprise means for: receiving, from the access node, the second measurement and reporting configuration for a second cell of the configured set, wherein the second measurement and reporting configuration indicates that a report activation state is to be set to inactive; abstaining from measuring and reporting, to the access node, the second cell based on the second measurement and reporting configuration; sending, to the access node, the indication that the activation condition is met for the second cell; add the second cell to the active set based on a confirmation indication from the access node; and measuring and reporting, to the access node, the second cell based on the second measurement and reporting configuration.

The indication that the activation condition is met for the second cell may be sent in a medium access control control element message.

The indication that the activation condition is met for the second cell may be sent to a distributed unit of the access node in a medium access control control element message.

The apparatus may comprise means for: receiving, from the access node, at least one indication indicating that the report activation state is to be set to active and that resources for the second measurement and reporting configuration have been reserved by the access node; and in response to receiving the at least one confirmation indication, measure and report, to the access node, the second cell based on the second measurement and reporting configuration using the resources.

The at least one indication that the report activation state is to be set to active and that resources have been reserved by the access node may be received in a medium access control control element message.

The apparatus may comprise means for: determining that the activation condition is met for a third cell, wherein the third cell is served by a same distributed unit of the access node serving the first cell and the at least one second cell, wherein the third cell is a target cell and is not part of the active set or the configured set; and sending, to the same distributed unit of the access node, an indication that the condition is met for the third cell; receiving, from the access node, a third measurement and reporting configuration for the third cell with a report activation state set to active and at least one indication that resources for the third measurement and reporting configuration have been reserved by the access node; and measuring and reporting, to the access node, the third cell based on the third measurement and reporting configuration using the resources.

The apparatus may comprise means for: determining that the activation condition is met for a fourth cell, wherein the fourth cell is a target cell and is not part of the active set or the configured set; sending to the access node, an indication that the condition is met for the fourth cell; and receiving, from the access node, an indication to send, to the access node, a layer 3 report for the fourth cell.

The indication that the report activation state is to be set to active may be received in a medium access control control element message; and/or the indication to send, to the access node, a layer 3 report for the fourth cell may be received in a medium access control control element message.

The apparatus may comprise means for: receiving, from the access node, the second measurement and reporting configuration for a plurality of second cells of the configured set; abstaining from measuring and reporting, to the access node, the plurality of second cells based on the second measurement and reporting configuration; sending, to the access node, an indication that the activation condition is met and the second measurement and reporting configuration is applied for at least one of the plurality of second cells; adding the at least one of the plurality of second cells to the active set based on a confirmation indication from the access node; and measuring and reporting, to the access node, the plurality of second cells based on the second measurement and reporting configuration.

The apparatus may comprise means for: receiving, from the access node, the activation condition.

The activation condition may be received in a radio resource control reconfiguration message.

The activation condition may comprise at least one measurement identifiers identifying at least one layer 3 measurement events.

The at least one layer 3 measurement events may comprise a layer 3 measurement exceeding a layer 3 measurement threshold.

The activation condition may comprise a reference signal received power measurement, a reference signal received quality measurement, a signal to interference plus noise ratio measurement, a reference signal strength indicator measurement, a received signal quality measurement, a received signal strength measurement or a reference signal strength indicator measurement exceeding respectively a reference signal received power measurement threshold, a reference signal received quality measurement threshold, a signal to interference plus noise ratio measurement threshold, a received signal quality threshold, a received signal strength threshold or threshold.

At least one of the first measurement and reporting configuration, the second measurement and reporting configuration, the third measurement and reporting configuration and the fourth measurement and reporting configuration may be a layer 1 measurement and reporting configuration.

At least one of the first measurement and reporting configuration, the second measurement and reporting configuration, the third measurement and reporting configuration and the fourth measurement and reporting configuration may be a channel state information reference signal or a synchronisation signal block measurement and reporting configuration.

The apparatus may comprise means for: sending, to the access node, an indication that a deactivation condition is met for the at least one first cell and/or the at least one second cell; removing the at least one first cell and/or the at least one second cell from the active set based on a confirmation indication from the access node; and abstaining from measuring and reporting, to the access node, the at least one first cells and/or the at least one second cell based on the first measurement and reporting configuration and/or the second measurement and reporting configuration.

The apparatus may be a user equipment.

The access node may comprise a distributed architecture.

The access node may comprise a gNodeB.

The access node may serve a serving cell for the apparatus.

According to an aspect there is provided an apparatus comprising at least one processor and at least one memory including computer code for one or more programs, the at least one memory and the computer code configured, with the at least one processor, to cause the apparatus at least to receive, from an access node, a first measurement and reporting configuration for at least one first cell of an active set and a second measurement and reporting configuration for at least one second cell of a configured set, wherein the at least one second cell is a target cell and not part of the active set; measure and report, to the access node, the at least one first cell based on the first measurement and reporting configuration; abstain from measuring and reporting, to the access node, the at least one second cell based on the second measurement and reporting configuration; send, to the access node, an indication that an activation condition is met for the at least one second cell; add the at least one second cell to the active set based on a confirmation indication from the access node; and measure and report, to the access node, the at least one second cell based on the second measurement and reporting configuration.

The at least one memory and the computer code may be configured, with the at least one processor, to cause the apparatus at least to: receive, from the access node, the second measurement and reporting configuration for a second cell of the configured set, wherein the second measurement and reporting configuration indicates that a report activation state is to be set to inactive; abstain from measuring and reporting, to the access node, the second cell based on the second measurement and reporting configuration; send, to the access node, the indication that the activation condition is met for the second cell; add the second cell to the active set based on a confirmation indication from the access node; and measure and report, to the access node, the second cell based on the second measurement and reporting configuration.

The indication that the activation condition is met for the second cell may be sent in a medium access control control element message.

The indication that the activation condition is met for the second cell may be sent to a distributed unit of the access node in a medium access control control element message.

The at least one memory and the computer code may be configured, with the at least one processor, to cause the apparatus at least to: receive, from the access node, at least one indication indicating that the report activation state is to be set to active and that resources for the second measurement and reporting configuration have been reserved by the access node; and in response to receiving the at least one confirmation indication, measure and report, to the access node, the second cell based on the second measurement and reporting configuration using the resources.

The at least one indication that the report activation state is to be set to active and that resources have been reserved by the access node may be received in a medium access control control element message.

The at least one memory and the computer code may be configured, with the at least one processor, to cause the apparatus at least to: determine that the activation condition is met for a third cell, wherein the third cell is served by a same distributed unit of the access node serving the first cell and the at least one second cell, wherein the third cell is a target cell and is not part of the active set or the configured set; and send, to the same distributed unit of the access node, an indication that the condition is met for the third cell; receive, from the access node, a third measurement and reporting configuration for the third cell with a report activation state set to active and at least one indication that resources for the third measurement and reporting configuration have been reserved by the access node; and measure and report, to the access node, the third cell based on the third measurement and reporting configuration using the resources.

The at least one memory and the computer code may be configured, with the at least one processor, to cause the apparatus at least to: determine that the activation condition is met for a fourth cell, wherein the fourth cell is a target cell and is not part of the active set or the configured set; send to the access node, an indication that the condition is met for the fourth cell; and receive, from the access node, an indication to send, to the access node, a layer 3 report for the fourth cell.

The indication that the report activation state is to be set to active may be received in a medium access control control element message; and/or the indication to send, to the access node, a layer 3 report for the fourth cell may be received in a medium access control control element message.

The at least one memory and the computer code may be configured, with the at least one processor, to cause the apparatus at least to: receive, from the access node, the second measurement and reporting configuration for a plurality of second cells of the configured set; abstain from measuring and reporting, to the access node, the plurality of second cells based on the second measurement and reporting configuration; send, to the access node, an indication that the activation condition is met and the second measurement and reporting configuration is applied for at least one of the plurality of second cells; add the at least one of the plurality of second cells to the active set based on a confirmation indication from the access node; and measure and report, to the access node, the plurality of second cells based on the second measurement and reporting configuration.

The at least one memory and the computer code may be configured, with the at least one processor, to cause the apparatus at least to: receive, from the access node, the activation condition.

The activation condition may be received in a radio resource control reconfiguration message.

The activation condition may comprise at least one measurement identifiers identifying at least one layer 3 measurement events.

The at least one layer 3 measurement events may comprise a layer 3 measurement exceeding a layer 3 measurement threshold.

The activation condition may comprise a reference signal received power measurement, a reference signal received quality measurement, a signal to interference plus noise ratio measurement, a reference signal strength indicator measurement, a received signal quality measurement, a received signal strength measurement or a reference signal strength indicator measurement exceeding respectively a reference signal received power measurement threshold, a reference signal received quality measurement threshold, a signal to interference plus noise ratio measurement threshold, a received signal quality threshold, a received signal strength threshold or threshold.

At least one of the first measurement and reporting configuration, the second measurement and reporting configuration, the third measurement and reporting configuration and the fourth measurement and reporting configuration may be a layer 1 measurement and reporting configuration.

At least one of the first measurement and reporting configuration, the second measurement and reporting configuration, the third measurement and reporting configuration and the fourth measurement and reporting configuration may be a channel state information reference signal or a synchronisation signal block measurement and reporting configuration.

The at least one memory and the computer code may be configured, with the at least one processor, to cause the apparatus at least to: send, to the access node, an indication that a deactivation condition is met for the at least one first cell and/or the at least one second cell; remove the at least one first cell and/or the at least one second cell from the active set based on a confirmation indication from the access node; and abstain from measuring and reporting, to the access node, the at least one first cells and/or the at least one second cell based on the first measurement and reporting configuration and/or the second measurement and reporting configuration.

The apparatus may be a user equipment.

The access node may comprise a distributed architecture.

The access node may comprise a gNodeB.

The access node may serve a serving cell for the apparatus.

According to an aspect there is provided an apparatus comprising circuitry configured to: receive, from an access node, a first measurement and reporting configuration for at least one first cell of an active set and a second measurement and reporting configuration for at least one second cell of a configured set, wherein the at least one second cell is a target cell and not part of the active set; measure and report, to the access node, the at least one first cell based on the first measurement and reporting configuration; abstain from measuring and reporting, to the access node, the at least one second cell based on the second measurement and reporting configuration; send, to the access node, an indication that an activation condition is met for the at least one second cell; add the at least one second cell to the active set based on a confirmation indication from the access node; and measure and report, to the access node, the at least one second cell based on the second measurement and reporting configuration.

The apparatus may comprise circuitry configured to: receive, from the access node, the second measurement and reporting configuration for a second cell of the configured set, wherein the second measurement and reporting configuration indicates that a report activation state is to be set to inactive; abstain from measuring and reporting, to the access node, the second cell based on the second measurement and reporting configuration; send, to the access node, the indication that the activation condition is met for the second cell; add the second cell to the active set based on a confirmation indication from the access node; and measure and report, to the access node, the second cell based on the second measurement and reporting configuration.

The indication that the activation condition is met for the second cell may be sent in a medium access control control element message.

The indication that the activation condition is met for the second cell may be sent to a distributed unit of the access node in a medium access control control element message.

The apparatus may comprise circuitry configured to: receive, from the access node, at least one indication indicating that the report activation state is to be set to active and that resources for the second measurement and reporting configuration have been reserved by the access node; and in response to receiving the at least one confirmation indication, measure and report, to the access node, the second cell based on the second measurement and reporting configuration using the resources.

The at least one indication that the report activation state is to be set to active and that resources have been reserved by the access node may be received in a medium access control control element message.

The apparatus may comprise circuitry configured to: determine that the activation condition is met for a third cell, wherein the third cell is served by a same distributed unit of the access node serving the first cell and the at least one second cell, wherein the third cell is a target cell and is not part of the active set or the configured set; and send, to the same distributed unit of the access node, an indication that the condition is met for the third cell; receive, from the access node, a third measurement and reporting configuration for the third cell with a report activation state set to active and at least one indication that resources for the third measurement and reporting configuration have been reserved by the access node; and measure and report, to the access node, the third cell based on the third measurement and reporting configuration using the resources.

The apparatus may comprise circuitry configured to: determine that the activation condition is met for a fourth cell, wherein the fourth cell is a target cell and is not part of the active set or the configured set; send to the access node, an indication that the condition is met for the fourth cell; and receive, from the access node, an indication to send, to the access node, a layer 3 report for the fourth cell.

The indication that the report activation state is to be set to active may be received in a medium access control control element message; and/or the indication to send, to the access node, a layer 3 report for the fourth cell may be received in a medium access control control element message.

The apparatus may comprise circuitry configured to: receive, from the access node, the second measurement and reporting configuration for a plurality of second cells of the configured set; abstain from measuring and reporting, to the access node, the plurality of second cells based on the second measurement and reporting configuration; send, to the access node, an indication that the activation condition is met and the second measurement and reporting configuration is applied for at least one of the plurality of second cells; add the at least one of the plurality of second cells to the active set based on a confirmation indication from the access node; and measure and report, to the access node, the plurality of second cells based on the second measurement and reporting configuration.

The apparatus may comprise circuitry configured to: receive, from the access node, the activation condition.

The activation condition may be received in a radio resource control reconfiguration message.

The activation condition may comprise at least one measurement identifiers identifying at least one layer 3 measurement events.

The at least one layer 3 measurement events may comprise a layer 3 measurement exceeding a layer 3 measurement threshold.

The activation condition may comprise a reference signal received power measurement, a reference signal received quality measurement, a signal to interference plus noise ratio measurement, a reference signal strength indicator measurement, a received signal quality measurement, a received signal strength measurement or a reference signal strength indicator measurement exceeding respectively a reference signal received power measurement threshold, a reference signal received quality measurement threshold, a signal to interference plus noise ratio measurement threshold, a received signal quality threshold, a received signal strength threshold or threshold.

At least one of the first measurement and reporting configuration, the second measurement and reporting configuration, the third measurement and reporting configuration and the fourth measurement and reporting configuration may be a layer 1 measurement and reporting configuration.

At least one of the first measurement and reporting configuration, the second measurement and reporting configuration, the third measurement and reporting configuration and the fourth measurement and reporting configuration may be a channel state information reference signal or a synchronisation signal block measurement and reporting configuration.

The apparatus may comprise circuitry configured to: send, to the access node, an indication that a deactivation condition is met for the at least one first cell and/or the at least one second cell; remove the at least one first cell and/or the at least one second cell from the active set based on a confirmation indication from the access node; and abstain from measuring and reporting, to the access node, the at least one first cells and/or the at least one second cell based on the first measurement and reporting configuration and/or the second measurement and reporting configuration.

The apparatus may be a user equipment.

The access node may comprise a distributed architecture.

The access node may comprise a gNodeB.

The access node may serve a serving cell for the apparatus.

According to an aspect there is provided a method comprising: receiving, from an access node, a first measurement and reporting configuration for at least one first cell of an active set and a second measurement and reporting configuration for at least one second cell of a configured set, wherein the at least one second cell is a target cell and not part of the active set; measuring and reporting, to the access node, the at least one first cell based on the first measurement and reporting configuration; abstain from measuring and reporting, to the access node, the at least one second cell based on the second measurement and reporting configuration; sending, to the access node, an indication that an activation condition is met for the at least one second cell; adding the at least one second cell to the active set based on a confirmation indication from the access node; and measuring and reporting, to the access node, the at least one second cell based on the second measurement and reporting configuration.

The method may comprise: receiving, from the access node, the second measurement and reporting configuration for a second cell of the configured set, wherein the second measurement and reporting configuration indicates that a report activation state is to be set to inactive; abstaining from measuring and reporting, to the access node, the second cell based on the second measurement and reporting configuration; sending, to the access node, the indication that the activation condition is met for the second cell; add the second cell to the active set based on a confirmation indication from the access node; and measuring and reporting, to the access node, the second cell based on the second measurement and reporting configuration.

The indication that the activation condition is met for the second cell may be sent in a medium access control control element message.

The indication that the activation condition is met for the second cell may be sent to a distributed unit of the access node in a medium access control control element message.

The method may comprise: receiving, from the access node, at least one indication indicating that the report activation state is to be set to active and that resources for the second measurement and reporting configuration have been reserved by the access node; and in response to receiving the at least one confirmation indication, measure and report, to the access node, the second cell based on the second measurement and reporting configuration using the resources.

The at least one indication that the report activation state is to be set to active and that resources have been reserved by the access node may be received in a medium access control control element message.

The method may comprise: determining that the activation condition is met for a third cell, wherein the third cell is served by a same distributed unit of the access node serving the first cell and the at least one second cell, wherein the third cell is a target cell and is not part of the active set or the configured set; and sending, to the same distributed unit of the access node, an indication that the condition is met for the third cell; receiving, from the access node, a third measurement and reporting configuration for the third cell with a report activation state set to active and at least one indication that resources for the third measurement and reporting configuration have been reserved by the access node; and measuring and reporting, to the access node, the third cell based on the third measurement and reporting configuration using the resources.

The method may comprise: determining that the activation condition is met for a fourth cell, wherein the fourth cell is a target cell and is not part of the active set or the configured set; sending to the access node, an indication that the condition is met for the fourth cell; and receiving, from the access node, an indication to send, to the access node, a layer 3 report for the fourth cell.

The indication that the report activation state is to be set to active may be received in a medium access control control element message; and/or the indication to send, to the access node, a layer 3 report for the fourth cell may be received in a medium access control control element message.

The method may comprise: receiving, from the access node, the second measurement and reporting configuration for a plurality of second cells of the configured set; abstaining from measuring and reporting, to the access node, the plurality of second cells based on the second measurement and reporting configuration; sending, to the access node, an indication that the activation condition is met and the second measurement and reporting configuration is applied for at least one of the plurality of second cells; adding the at least one of the plurality of second cells to the active set based on a confirmation indication from the access node; and measuring and reporting, to the access node, the plurality of second cells based on the second measurement and reporting configuration.

The method may comprise: receiving, from the access node, the activation condition.

The activation condition may be received in a radio resource control reconfiguration message.

The activation condition may comprise at least one measurement identifiers identifying at least one layer 3 measurement events.

The at least one layer 3 measurement events may comprise a layer 3 measurement exceeding a layer 3 measurement threshold.

The activation condition may comprise a reference signal received power measurement, a reference signal received quality measurement, a signal to interference plus noise ratio measurement, a reference signal strength indicator measurement, a received signal quality measurement, a received signal strength measurement or a reference signal strength indicator measurement exceeding respectively a reference signal received power measurement threshold, a reference signal received quality measurement threshold, a signal to interference plus noise ratio measurement threshold, a received signal quality threshold, a received signal strength threshold or threshold.

At least one of the first measurement and reporting configuration, the second measurement and reporting configuration, the third measurement and reporting configuration and the fourth measurement and reporting configuration may be a layer 1 measurement and reporting configuration.

At least one of the first measurement and reporting configuration, the second measurement and reporting configuration, the third measurement and reporting configuration and the fourth measurement and reporting configuration may be a channel state information reference signal or a synchronisation signal block measurement and reporting configuration.

The method may comprise: sending, to the access node, an indication that a deactivation condition is met for the at least one first cell and/or the at least one second cell; removing the at least one first cell and/or the at least one second cell from the active set based on a confirmation indication from the access node; and abstaining from measuring and reporting, to the access node, the at least one first cells and/or the at least one second cell based on the first measurement and reporting configuration and/or the second measurement and reporting configuration.

The method may be performed by a user equipment.

The access node may comprise a distributed architecture.

The access node may comprise a gNodeB.

The access node may serve a serving cell for the apparatus.

According to an aspect there is provided a computer program comprising computer executable code which when run on at least one processor is configured to: receive, from an access node, a first measurement and reporting configuration for at least one first cell of an active set and a second measurement and reporting configuration for at least one second cell of a configured set, wherein the at least one second cell is a target cell and not part of the active set; measure and report, to the access node, the at least one first cell based on the first measurement and reporting configuration; abstain from measuring and reporting, to the access node, the at least one second cell based on the second measurement and reporting configuration; send, to the access node, an indication that an activation condition is met for the at least one second cell; add the at least one second cell to the active set based on a confirmation indication from the access node; and measure and report, to the access node, the at least one second cell based on the second measurement and reporting configuration.

The computer program may comprise computer executable code which when run on at least one processor is configured to: receive, from the access node, the second measurement and reporting configuration for a second cell of the configured set, wherein the second measurement and reporting configuration indicates that a report activation state is to be set to inactive; abstain from measuring and reporting, to the access node, the second cell based on the second measurement and reporting configuration; send, to the access node, the indication that the activation condition is met for the second cell; add the second cell to the active set based on a confirmation indication from the access node; and measure and report, to the access node, the second cell based on the second measurement and reporting configuration.

The indication that the activation condition is met for the second cell may be sent in a medium access control control element message.

The indication that the activation condition is met for the second cell may be sent to a distributed unit of the access node in a medium access control control element message.

The computer program may comprise computer executable code which when run on at least one processor is configured to: receive, from the access node, at least one indication indicating that the report activation state is to be set to active and that resources for the second measurement and reporting configuration have been reserved by the access node; and in response to receiving the at least one confirmation indication, measure and report, to the access node, the second cell based on the second measurement and reporting configuration using the resources.

The at least one indication that the report activation state is to be set to active and that resources have been reserved by the access node may be received in a medium access control control element message.

The computer program may comprise computer executable code which when run on at least one processor is configured to: determine that the activation condition is met for a third cell, wherein the third cell is served by a same distributed unit of the access node serving the first cell and the at least one second cell, wherein the third cell is a target cell and is not part of the active set or the configured set; and send, to the same distributed unit of the access node, an indication that the condition is met for the third cell; receive, from the access node, a third measurement and reporting configuration for the third cell with a report activation state set to active and at least one indication that resources for the third measurement and reporting configuration have been reserved by the access node; and measure and report, to the access node, the third cell based on the third measurement and reporting configuration using the resources.

The computer program may comprise computer executable code which when run on at least one processor is configured to: determine that the activation condition is met for a fourth cell, wherein the fourth cell is a target cell and is not part of the active set or the configured set; send to the access node, an indication that the condition is met for the fourth cell; and receive, from the access node, an indication to send, to the access node, a layer 3 report for the fourth cell.

The indication that the report activation state is to be set to active may be received in a medium access control control element message; and/or the indication to send, to the access node, a layer 3 report for the fourth cell may be received in a medium access control control element message.

The computer program may comprise computer executable code which when run on at least one processor is configured to: receive, from the access node, the second measurement and reporting configuration for a plurality of second cells of the configured set; abstain from measuring and reporting, to the access node, the plurality of second cells based on the second measurement and reporting configuration; send, to the access node, an indication that the activation condition is met and the second measurement and reporting configuration is applied for at least one of the plurality of second cells; add the at least one of the plurality of second cells to the active set based on a confirmation indication from the access node; and measure and report, to the access node, the plurality of second cells based on the second measurement and reporting configuration.

The computer program may comprise computer executable code which when run on at least one processor is configured to: receive, from the access node, the activation condition.

The activation condition may be received in a radio resource control reconfiguration message.

The activation condition may comprise at least one measurement identifiers identifying at least one layer 3 measurement events.

The at least one layer 3 measurement events may comprise a layer 3 measurement exceeding a layer 3 measurement threshold.

The activation condition may comprise a reference signal received power measurement, a reference signal received quality measurement, a signal to interference plus noise ratio measurement, a reference signal strength indicator measurement, a received signal quality measurement, a received signal strength measurement or a reference signal strength indicator measurement exceeding respectively a reference signal received power measurement threshold, a reference signal received quality measurement threshold, a signal to interference plus noise ratio measurement threshold, a received signal quality threshold, a received signal strength threshold or threshold.

At least one of the first measurement and reporting configuration, the second measurement and reporting configuration, the third measurement and reporting configuration and the fourth measurement and reporting configuration may be a layer 1 measurement and reporting configuration.

At least one of the first measurement and reporting configuration, the second measurement and reporting configuration, the third measurement and reporting configuration and the fourth measurement and reporting configuration may be a channel state information reference signal or a synchronisation signal block measurement and reporting configuration.

The computer program may comprise computer executable code which when run on at least one processor is configured to: send, to the access node, an indication that a deactivation condition is met for the at least one first cell and/or the at least one second cell; remove the at least one first cell and/or the at least one second cell from the active set based on a confirmation indication from the access node; and abstain from measuring and reporting, to the access node, the at least one first cells and/or the at least one second cell based on the first measurement and reporting configuration and/or the second measurement and reporting configuration.

The at least one processor may be part of a user equipment.

The access node may comprise a distributed architecture.

The access node may comprise a gNodeB.

The access node may serve a serving cell for the apparatus.

According to an aspect there is provided an apparatus comprising means for: sending, to a user equipment, a first measurement and reporting configuration for at least one first cell of an active set; and sending, to the user equipment, a second measurement and reporting configuration for at least one second cell of a configured set, wherein the at least one second cell is a target cell and is not part of the active cell.

The apparatus may comprise means for: receiving an indication, from a same distributed unit of the apparatus serving the first cell and the at least one second cell, to send a third measurement and reporting configuration for a third cell served by the same distributed unit, wherein the third cell is a target cell and is not part of the active set or the configured set; and send the third measurement and reporting configuration for the third cell to the user equipment.

The apparatus may comprise means for: receiving an indication, from a serving distributed unit of the apparatus, to send an indication to a distributed unit of the apparatus serving a cell in the configured set to reserve resources for a measurement and reporting configuration for the user equipment when the cell in the configured set is added to the active set; and sending an indication, to the distributed unit of the apparatus, serving the cell in the configured set to reserve resources for the user equipment when the cell in the configured set is added to the active set.

The apparatus may comprise means for: receiving, from the user equipment, a layer 3 report for a fourth cell, wherein the fourth cell is a target cell and is not part of the active set or the configured set; initiating preparation of a fourth measurement and reporting configuration with a distributed unit serving the fourth cell; and sending the fourth measurement and reporting configuration for the fourth cell to the user equipment.

The apparatus may be an access node.

The apparatus may be a central unit of an access node comprising a distributed architecture.

The apparatus may comprise means for: receiving, from the user equipment, a report for at least one first cells of an active set based on a first measurement and reporting configuration; receiving, from the user equipment, an indication that an activation condition is met for at least one second cell of a configured set, wherein the at least one second cell is a target cell and is not part of the active cell; sending a confirmation indication; and receiving, from the user equipment, a report for the at least one second cell based on a second measurement and reporting configuration.

The apparatus may comprise means for: sending, to the user equipment, an indication of resources for the at least one second measurement and reporting configuration reserved by the apparatus; and receiving, from the user equipment, the report for the at least one second cell based on the second measurement and reporting configuration using the resources.

The apparatus may comprise means for: receiving, from the user equipment, an indication that the activation condition is met for a third cell, wherein the third cell is a target cell and is not part of the configured set or the active set; reserving resources for a third measurement and reporting configuration and prepare the third measurement and reporting configuration for the third cell; sending an indication, to a central unit of the apparatus, that the third measurement and reporting configuration has to be sent to the user equipment for the third cell; and receiving, from the user equipment, a report for the third cell based on the third measurement and reporting configuration.

The apparatus may comprise means for: sending, to the user equipment, an indication to send a layer 3 report for a fourth cell, wherein the fourth cell is a target cell and not part of the active set or the configured set.

The apparatus may be a distributed unit of an access node comprising a distributed architecture.

According to an aspect there is provided an apparatus comprising at least one processor and at least one memory including computer code for one or more programs, the at least one memory and the computer code configured, with the at least one processor, to cause the apparatus at least to: send, to a user equipment, a first measurement and reporting configuration for at least one first cell of an active set; and send, to the user equipment, a second measurement and reporting configuration for at least one second cell of a configured set, wherein the at least one second cell is a target cell and is not part of the active cell.

The at least one memory and the computer code may be configured, with the at least one processor, to cause the apparatus at least to: receive an indication, from a same distributed unit of the apparatus serving the first cell and the at least one second cell, to send a third measurement and reporting configuration for a third cell served by the same distributed unit, wherein the third cell is a target cell and is not part of the active set or the configured set; and send the third measurement and reporting configuration for the third cell to the user equipment.

The at least one memory and the computer code may be configured, with the at least one processor, to cause the apparatus at least to: receive an indication, from a serving distributed unit of the apparatus, to send an indication to a distributed unit of the apparatus serving a cell in the configured set to reserve resources for a measurement and reporting configuration for the user equipment when the cell in the configured set is added to the active set; and send an indication, to the distributed unit of the apparatus, serving the cell in the configured set to reserve resources for the user equipment when the cell in the configured set is added to the active set.

The at least one memory and the computer code may be configured, with the at least one processor, to cause the apparatus at least to: receive, from the user equipment, a layer 3 report for a fourth cell, wherein the fourth cell is a target cell and is not part of the active set or the configured set; initiate preparation of a fourth measurement and reporting configuration with a distributed unit serving the fourth cell; and send the fourth measurement and reporting configuration for the fourth cell to the user equipment.

The apparatus may be an access node.

The apparatus may be a central unit of an access node comprising a distributed architecture.

The at least one memory and the computer code may be configured, with the at least one processor, to cause the apparatus at least to: receive, from the user equipment, a report for at least one first cells of an active set based on a first measurement and reporting configuration; receive, from the user equipment, an indication that an activation condition is met for at least one second cell of a configured set, wherein the at least one second cell is a target cell and is not part of the active cell; send a confirmation indication; and receive, from the user equipment, a report for the at least one second cell based on a second measurement and reporting configuration.

The at least one memory and the computer code may be configured, with the at least one processor, to cause the apparatus at least to: send, to the user equipment, an indication of resources for the at least one second measurement and reporting configuration reserved by the apparatus; and receive, from the user equipment, the report for the at least one second cell based on the second measurement and reporting configuration using the resources.

The at least one memory and the computer code may be configured, with the at least one processor, to cause the apparatus at least to: receive, from the user equipment, an indication that the activation condition is met for a third cell, wherein the third cell is a target cell and is not part of the configured set or the active set; reserve resources for a third measurement and reporting configuration and prepare the third measurement and reporting configuration for the third cell; send an indication, to a central unit of the apparatus, that the third measurement and reporting configuration has to be sent to the user equipment for the third cell; and receive, from the user equipment, a report for the third cell based on the third measurement and reporting configuration.

The at least one memory and the computer code may be configured, with the at least one processor, to cause the apparatus at least to: send, to the user equipment, an indication to send a layer 3 report for a fourth cell, wherein the fourth cell is a target cell and not part of the active set or the configured set.

The apparatus may be a distributed unit of an access node comprising a distributed architecture.

According to an aspect there is provided an apparatus comprising circuitry configured to: send, to a user equipment, a first measurement and reporting configuration for at least one first cell of an active set; and send, to the user equipment, a second measurement and reporting configuration for at least one second cell of a configured set, wherein the at least one second cell is a target cell and is not part of the active cell.

The apparatus may comprise circuitry configured to: receive an indication, from a same distributed unit of the apparatus serving the first cell and the at least one second cell, to send a third measurement and reporting configuration for a third cell served by the same distributed unit, wherein the third cell is a target cell and is not part of the active set or the configured set; and send the third measurement and reporting configuration for the third cell to the user equipment.

The apparatus may comprise circuitry configured to: receive an indication, from a serving distributed unit of the apparatus, to send an indication to a distributed unit of the apparatus serving a cell in the configured set to reserve resources for a measurement and reporting configuration for the user equipment when the cell in the configured set is added to the active set; and send an indication, to the distributed unit of the apparatus, serving the cell in the configured set to reserve resources for the user equipment when the cell in the configured set is added to the active set.

The apparatus may comprise circuitry configured to: receive, from the user equipment, a layer 3 report for a fourth cell, wherein the fourth cell is a target cell and is not part of the active set or the configured set; initiate preparation of a fourth measurement and reporting configuration with a distributed unit serving the fourth cell; and send the fourth measurement and reporting configuration for the fourth cell to the user equipment.

The apparatus may be an access node.

The apparatus may be a central unit of an access node comprising a distributed architecture.

The apparatus may comprise circuitry configured to: receive, from the user equipment, a report for at least one first cells of an active set based on a first measurement and reporting configuration; receive, from the user equipment, an indication that an activation condition is met for at least one second cell of a configured set, wherein the at least one second cell is a target cell and is not part of the active cell; send a confirmation indication; and receive, from the user equipment, a report for the at least one second cell based on a second measurement and reporting configuration.

The apparatus may comprise circuitry configured to: send, to the user equipment, an indication of resources for the at least one second measurement and reporting configuration reserved by the apparatus; and receive, from the user equipment, the report for the at least one second cell based on the second measurement and reporting configuration using the resources.

The apparatus may comprise circuitry configured to: receive, from the user equipment, an indication that the activation condition is met for a third cell, wherein the third cell is a target cell and is not part of the configured set or the active set; reserve resources for a third measurement and reporting configuration and prepare the third measurement and reporting configuration for the third cell; send an indication, to a central unit of the apparatus, that the third measurement and reporting configuration has to be sent to the user equipment for the third cell; and receive, from the user equipment, a report for the third cell based on the third measurement and reporting configuration.

The apparatus may comprise circuitry configured to: send, to the user equipment, an indication to send a layer 3 report for a fourth cell, wherein the fourth cell is a target cell and not part of the active set or the configured set.

The apparatus may be a distributed unit of an access node comprising a distributed architecture.

According to an aspect there is provided a method comprising: sending, to a user equipment, a first measurement and reporting configuration for at least one first cell of an active set; and sending, to the user equipment, a second measurement and reporting configuration for at least one second cell of a configured set, wherein the at least one second cell is a target cell and is not part of the active cell.

The method may be performed by an apparatus.

The method may comprise: receiving an indication, from a same distributed unit of the apparatus serving the first cell and the at least one second cell, to send a third measurement and reporting configuration for a third cell served by the same distributed unit, wherein the third cell is a target cell and is not part of the active set or the configured set; and send the third measurement and reporting configuration for the third cell to the user equipment.

The method may comprise: receiving an indication, from a serving distributed unit of the apparatus, to send an indication to a distributed unit of the apparatus serving a cell in the configured set to reserve resources for a measurement and reporting configuration for the user equipment when the cell in the configured set is added to the active set; and sending an indication, to the distributed unit of the apparatus, serving the cell in the configured set to reserve resources for the user equipment when the cell in the configured set is added to the active set.

The method may comprise: receiving, from the user equipment, a layer 3 report for a fourth cell, wherein the fourth cell is a target cell and is not part of the active set or the configured set; initiating preparation of a fourth measurement and reporting configuration with a distributed unit serving the fourth cell; and sending the fourth measurement and reporting configuration for the fourth cell to the user equipment.

The apparatus may be an access node.

The apparatus may be a central unit of an access node comprising a distributed architecture.

The method may comprise: receiving, from the user equipment, a report for at least one first cells of an active set based on a first measurement and reporting configuration; receiving, from the user equipment, an indication that an activation condition is met for at least one second cell of a configured set, wherein the at least one second cell is a target cell and is not part of the active cell; sending a confirmation indication; and receiving, from the user equipment, a report for the at least one second cell based on a second measurement and reporting configuration.

The method may comprise: sending, to the user equipment, an indication of resources for the at least one second measurement and reporting configuration reserved by the apparatus; and receiving, from the user equipment, the report for the at least one second cell based on the second measurement and reporting configuration using the resources.

The method may comprise: receiving, from the user equipment, an indication that the activation condition is met for a third cell, wherein the third cell is a target cell and is not part of the configured set or the active set; reserving resources for a third measurement and reporting configuration and prepare the third measurement and reporting configuration for the third cell; sending an indication, to a central unit of the apparatus, that the third measurement and reporting configuration has to be sent to the user equipment for the third cell; and receiving, from the user equipment, a report for the third cell based on the third measurement and reporting configuration.

The method may comprise: sending, to the user equipment, an indication to send a layer 3 report for a fourth cell, wherein the fourth cell is a target cell and not part of the active set or the configured set.

The apparatus may be a distributed unit of an access node comprising a distributed architecture.

According to an aspect there is provided a computer program comprising computer executable code which when run on at least one processor is configured to: send, to a user equipment, a first measurement and reporting configuration for at least one first cell of an active set; and send, to the user equipment, a second measurement and reporting configuration for at least one second cell of a configured set, wherein the at least one second cell is a target cell and is not part of the active cell.

The at least one processor may be part of an apparatus.

The computer program may comprise computer executable code which when run on at least one processor is configured to: receive an indication, from a same distributed unit of the apparatus serving the first cell and the at least one second cell, to send a third measurement and reporting configuration for a third cell served by the same distributed unit, wherein the third cell is a target cell and is not part of the active set or the configured set; and send the third measurement and reporting configuration for the third cell to the user equipment.

The computer program may comprise computer executable code which when run on at least one processor is configured to: receive an indication, from a serving distributed unit of the apparatus, to send an indication to a distributed unit of the apparatus serving a cell in the configured set to reserve resources for a measurement and reporting configuration for the user equipment when the cell in the configured set is added to the active set; and send an indication, to the distributed unit of the apparatus, serving the cell in the configured set to reserve resources for the user equipment when the cell in the configured set is added to the active set.

The computer program may comprise computer executable code which when run on at least one processor is configured to: receive, from the user equipment, a layer 3 report for a fourth cell, wherein the fourth cell is a target cell and is not part of the active set or the configured set; initiate preparation of a fourth measurement and reporting configuration with a distributed unit serving the fourth cell; and send the fourth measurement and reporting configuration for the fourth cell to the user equipment.

The apparatus may be an access node.

The apparatus may be a central unit of an access node comprising a distributed architecture.

The computer program may comprise computer executable code which when run on at least one processor is configured to: receive, from the user equipment, a report for at least one first cells of an active set based on a first measurement and reporting configuration; receive, from the user equipment, an indication that an activation condition is met for at least one second cell of a configured set, wherein the at least one second cell is a target cell and is not part of the active cell; send a confirmation indication; and receive, from the user equipment, a report for the at least one second cell based on a second measurement and reporting configuration.

The computer program may comprise computer executable code which when run on at least one processor is configured to: send, to the user equipment, an indication of resources for the at least one second measurement and reporting configuration reserved by the apparatus; and receive, from the user equipment, the report for the at least one second cell based on the second measurement and reporting configuration using the resources.

The computer program may comprise computer executable code which when run on at least one processor is configured to: receive, from the user equipment, an indication that the activation condition is met for a third cell, wherein the third cell is a target cell and is not part of the configured set or the active set; reserve resources for a third measurement and reporting configuration and prepare the third measurement and reporting configuration for the third cell; send an indication, to a central unit of the apparatus, that the third measurement and reporting configuration has to be sent to the user equipment for the third cell; and receive, from the user equipment, a report for the third cell based on the third measurement and reporting configuration.

The computer program may comprise computer executable code which when run on at least one processor is configured to: send, to the user equipment, an indication to send a layer 3 report for a fourth cell, wherein the fourth cell is a target cell and not part of the active set or the configured set.

The apparatus may be a distributed unit of an access node comprising a distributed architecture.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

List of Abbreviations

AF: Application Function
AMF: Access and Mobility Management Function
AN: Access Node
API: Application Programming Interface
AS: Active Set
BS: Base Station
CE: Control Element
CU: Central Unit
CP: Control Plane
CSI: Channel State Information
DCI: Downlink Control Information
DL: Downlink
DU: Distributed Unit
gNB: gNodeB
GSM: Global System for Mobile communication HSS: Home Subscriber Server
IoT: Internet of Things
LTE: Long Term Evolution
MAC: Medium Access Control
MS: Mobile Station
mTRP: multiple Transmission Reception Point
MTC: Machine Type Communication
NEF: Network Exposure Function
NF: Network Function
NR: New radio
NRF: Network Repository Function
PDCP: Packet Data Convergence Protocol
PDU: Packet Data Unit
PHY: Physical
PS: (Pre-)configured Set
PUCCH: Physical Uplink Control Channel
PUSH: Physical Uplink Shared Channel
RAM: Random Access Memory
(R)AN: (Radio) Access Network
RLC: Radio Link Control
ROM: Read Only Memory
RRC: Radio Resource Control
RS: Reference Signal
RSRP: Reference Signal Received Power
RSRQ: Reference Signal Received Quality
RSSI: Received Signal Strength Indication
SINR: Signal to Interference plus Noise Ratio
SMF: Session Management Function
SSB: Synchronization Signal Block
SSC: Serving Cell Change
TCI: Transmission Configuration Indication
TR: Technical Report
TS: Technical Specification
UE: User Equipment
UMTS: Universal Mobile Telecommunication System
UP: User Plane
3GPP: 3$^{rd}$ Generation Partnership Project
5G: 5$^{th}$ Generation
5GC: 5G Core network
5GS: 5G System

BRIEF DESCRIPTION OF THE FIGURES

Embodiments will now be described, by way of example only, with reference to the accompanying Figures in which:

FIG. 9 shows a block diagram of a method for measuring and reporting a target cell in a communication system performed by a user equipment;

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
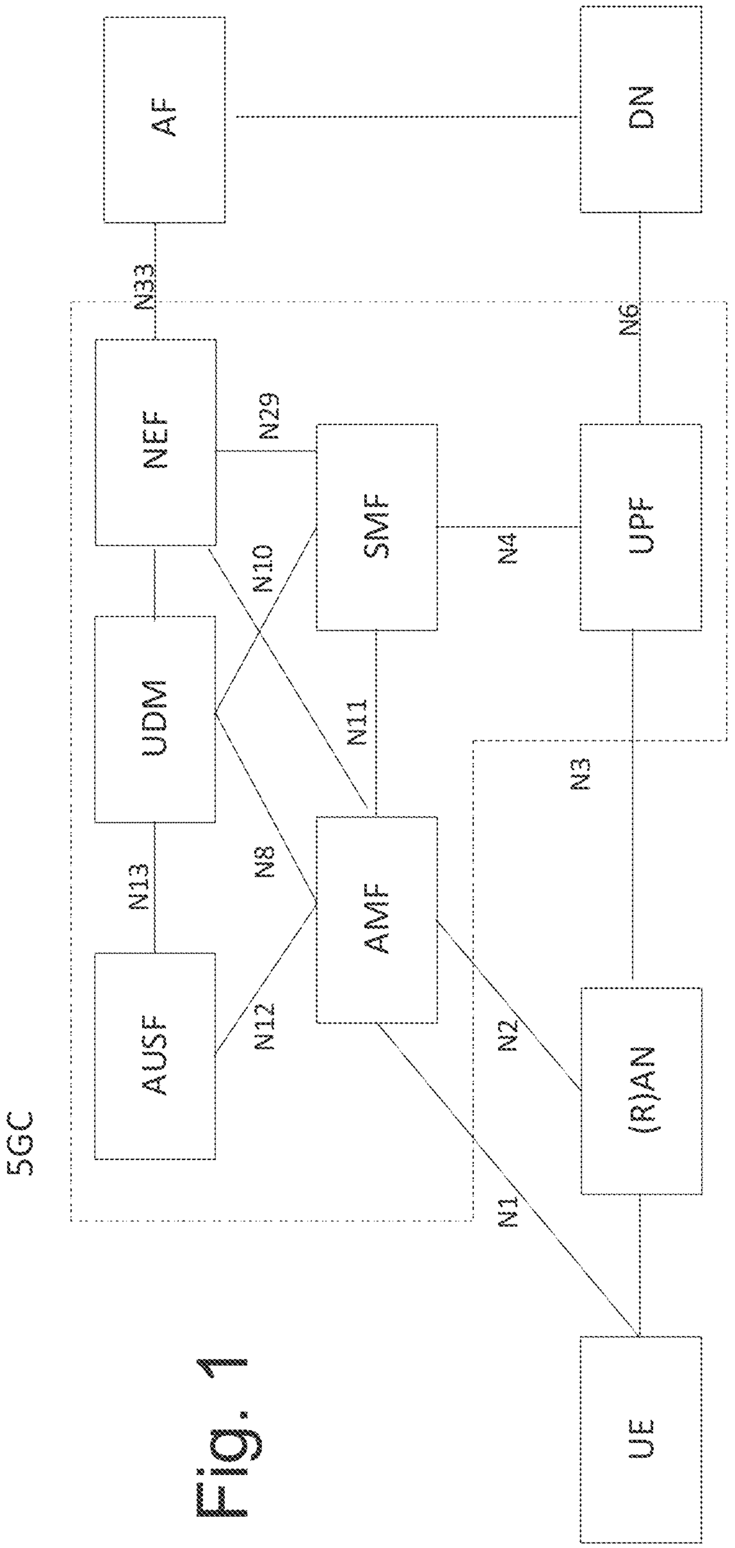
FIG. 1 shows a schematic representation of a 5G system.

FIG. 1 shows a schematic representation of a 5G system (5GS). The 5GS may comprises a terminal (UE), a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) central unit functions.

The 5GC may comprise an access and mobility management function (AMF), a session management function (SMF), an authentication server function (AUSF), a user data management (UDM), a user plane function (UPF) and/or a network exposure function (NEF).

Figure 2:
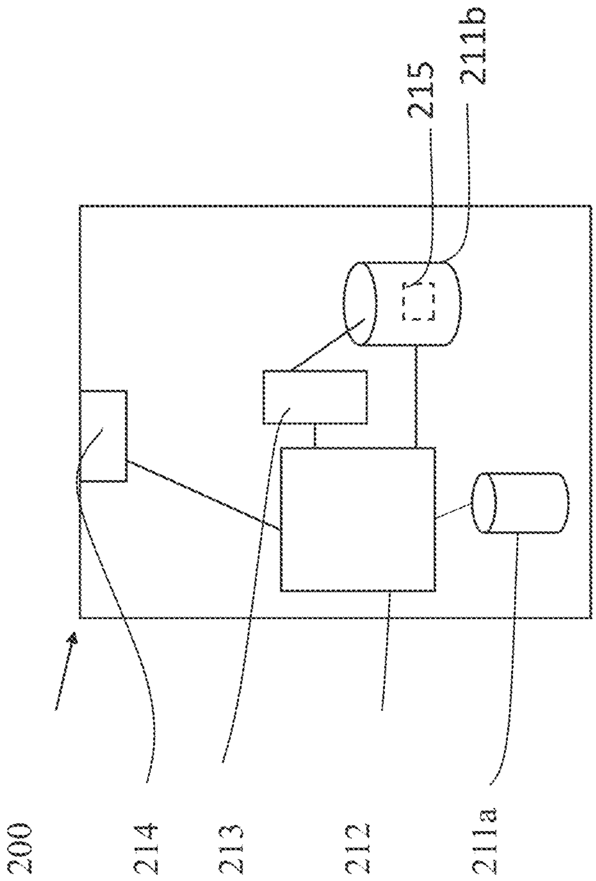
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
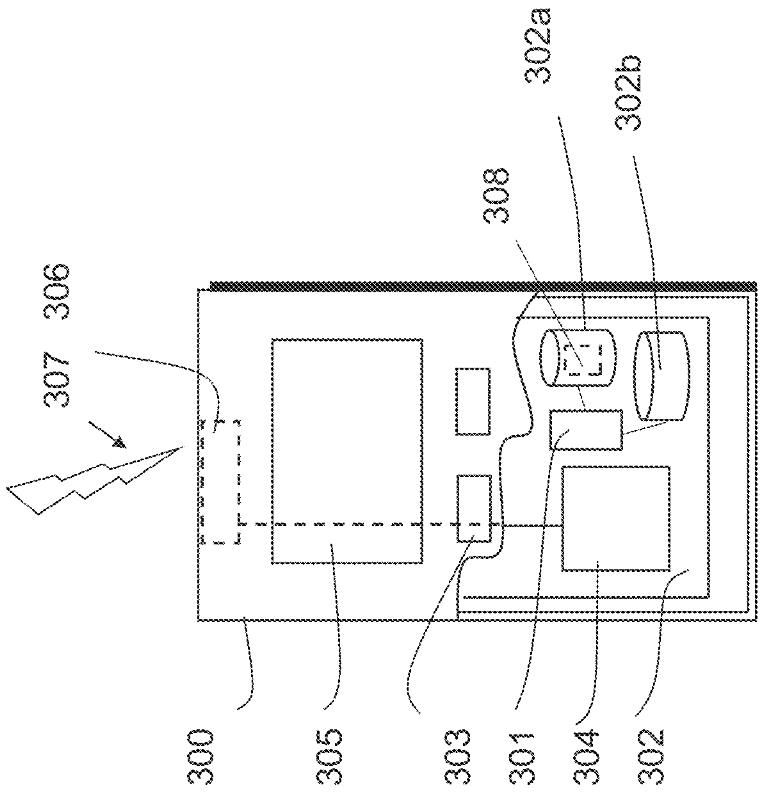
FIG. 3 shows a schematic representation of a terminal.

FIG. 3 illustrates an example of a terminal 300, such as the terminal (UE) illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Figure 4:
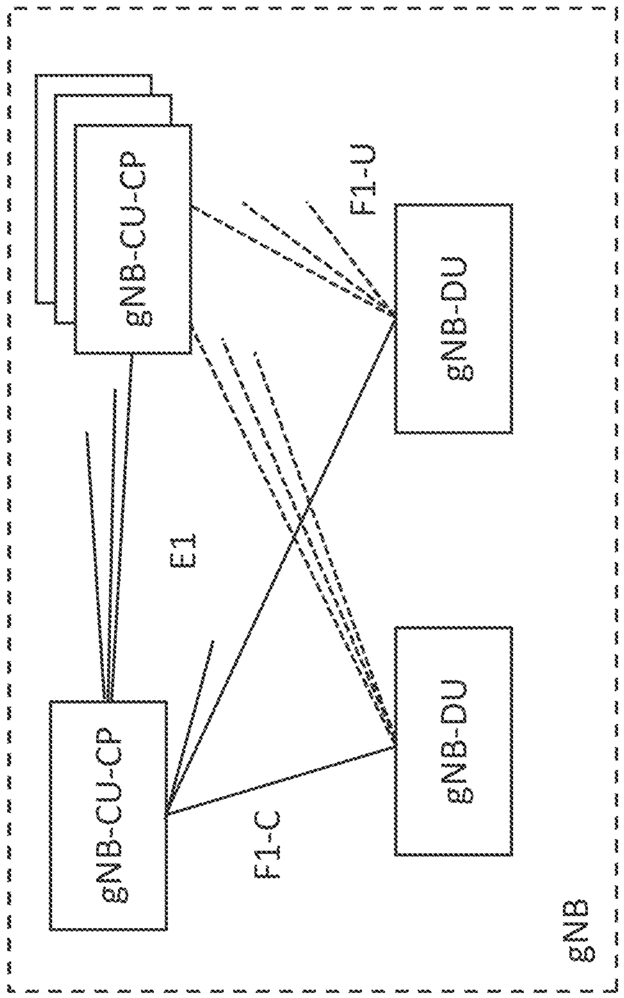
FIG. 4 shows a schematic representation of a disaggregated gNB Architecture.

FIG. 4 shows a schematic illustration of a disaggregated gNB architecture defined in 3GPP. The disaggregated architecture decomposes the gNB into multiple logical entities comprising a gNB central unit (CU) control plane (CP), a gNB central unit (CP) user plane (UP) and one or more gNB distributed units (DU). The disaggregated gNB may comprise one or more (physical) network devices. A network device may comprise one or more of these logical entities.

A gnB DU may serve multiple cells (maximum of 512 in current specifications). A gNB CU CP hosts a packet data convergence protocol (PDCP) layer and a radio resource control (RRC) layer. A gNB DU may host a radio link control (RLC) layer, a medium access control (MAC) layer and a physical (PHY) layer. Scheduling operations may may be implemented at a gNB-DU.

A Release 17 RAN1-led NR feMIMO (further enhancement multiple input multiple output) work item in 3GPP extends the multiple transmission reception point (mTRP) operation to support transmission and reception of multiple beams from different cells. The cells must belong to the same gNB-DU. Potential change of serving cell via L1/L2 measurement based mechanisms is out of scope. The Release 17 RAN1-led NR feMIMO work item is expected to impact all of RAN1-4 work groups (WG). Details of this work item may be found in 'RP-193133 New WID: Further enhancements on MIMO for NR'.

A support for change of serving-cell via L1/L2 measurement based mechanisms in both intra-DU and inter-DU scenarios may become topical in future.

In order to support L1/L2 measurement based mechanisms for changing serving cell in the dissagregated gNB architecture, a new mechanism may be needed.

Configuration may take place at the gNB CU CP but may be executed autonomously by the gNB DU without further interaction with the gNB CU CP.

All configurations relevant for L1/L2 measurement based mechanisms for changing serving cell may have to be delivered using RRC protocol.

Figure 5:
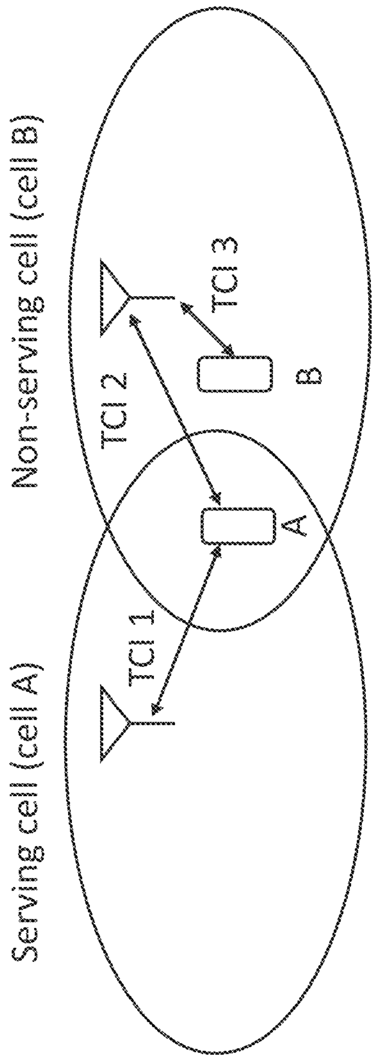
FIG. 5 shows a schematic representation of a L1/L2 measurement based mechanism for changing service cell.

FIG. 5 shows a schematic representation of a L1/L2 measurement based mechanism for changing service cell. A user equipment A may be served by a serving cell A. A user equipment B may be served by a serving cell B. The user equipment A may receive a transmission configuration indicator (TCI) 1 from the serving cell A. The user equipment A may receive a TCI 2 from the non-serving cell B. The user equipment B may receive a TCI 3 from the serving cell b.

Figure 6:
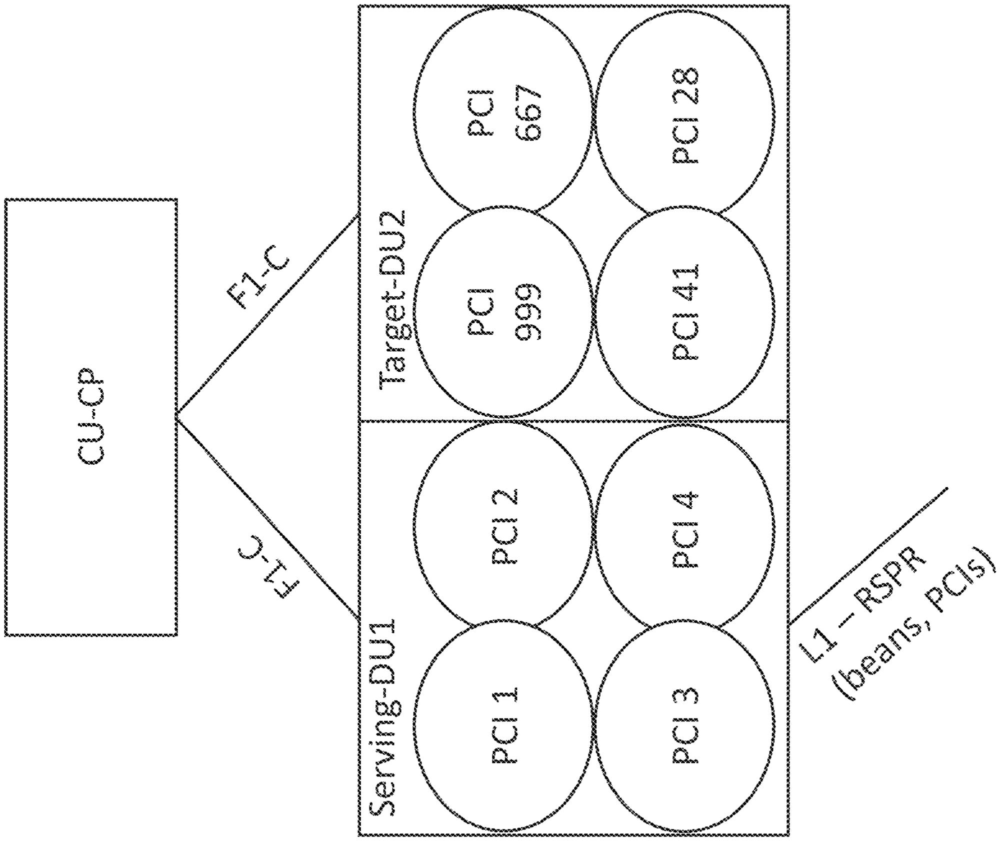
FIG. 6 shows a schematic representation of a disaggregated gNB Architecture wherein a user equipment is served by a serving distributed unit.

FIG. 6 shows a schematic representation of a disaggregated gNB Architecture wherein a user equipment is served by a serving DU1.

Let us consider the following scenario with respect to L1/L2 measurement based mechanism for changing serving cell.

At time T0 a UE may enter a cell identified by physical cell identifier PCI1 served by the serving DU1. The UE may be served by the cell identified by physical cell identifier PCI 1.

A gNB CU CP may send, via RRC Reconfiguration, a measurement and reporting configuration of the serving cell (PCI1) and two cells eligible for L1/L2 measurement based mechanism for changing serving cell (PCI2, PCI3).

According to RAN1, there may be scope to configure eight cells eligible for L1/L2 measurement based mechanism for changing serving cell. The UE may be asked to perform L1/L2 measurement based mechanism for changing serving cell based on a cell amongst the eight cells.

At this moment, the measurements configured on UE may be layer 1 (1) measurements and/or layer 3 (L3) measurements. L1 measurements may comprise channel state information (CSI) reference signal (RS) measurements and/or synchronisation signal block (SSB) measurements. L1 measurements may comprise reference signal received power (RSRP) measurements, reference signal received quality (RSRQ) measurements, signal to interference plus noise ratio (SINR) measurements or received signal strength indication (RSSI) measurements.

L3 measurements may comprise L1 measurements filtered at L3. L3 measurements may be event based or periodic.

AT time T1 the UE may move out of the cell identified by physical cell identifier PCI1 served by the serving DU1.

In a first scenario, the UE may move to a cell identified by physical cell identifier PCI2 served by the serving DU1 in the vicinity of a cell identified by physical cell identifier PCI4 served by the serving DU1.

The UE may perform intra-DU serving cell change using a L1/L2 measurement based mechanism for changing serving cell. The UE may need to measure and report the cell identified by physical cell identifier PCI4 to subsequently perform intra-DU serving cell change using a L1/L2 measurements.

In a second scenario, the UE may move to the cell identified by physical cell identifier PCI2 served by the serving DU1 in the vicinity of a cell identified by physical cell identifier PCI999 served by a target DU2.

The UE may perform intra-DU serving cell change using a L1/L2 measurement based mechanism for changing serving cell. The UE may need to measure and report the cell identified by physical cell identifier PCI4 to subsequently perform inter-DU serving cell change using a L1/L2 measurements.

One way to perform intra-DU serving cell change or inter-DU serving cell change using a L1/L2 measurements faster when the UE moves to a target cell is to configure target cells for L1 measurement and reporting. The CU CP may send measurement and reporting configuration for the target cells via RRC signalling.

However, this may lead to UE performing L1 measurement and reporting earlier than needed for some of the target cell. The L1 measurement may consume processing, memory and battery resources without much benefits. The reporting may consume physical uplink control channel (PUCCH) and/or physical uplink shared channel (PUSCH) resources without much benefits.

Moreover, when the CU CP sends measurement and reporting configurations for the target cells via RRC signalling, the CU CP may have to receive the RRC IE CellGroupConfig (parameters of RLC/MAC/PHY protocol layers controlled by the DU) from the DU. The RRC IE CellGroupConfig may also indicate PUCCH and/or PUSCH resources reserved by the DU for the measurement and reporting configurations for the target cells. This may lead PUCCH and/or PUSCH resources being reserved by the DU without guarantee that the UE will move to the target cells.

The CU may send measurement and reporting configurations to the UE via RRC signal to perform L3 measurements to report target cells becoming stronger than a threshold. The CU may send measurement and reporting configurations to the UE via RRC signal to perform L1 measurements and reporting the target cells becoming stronger than a threshold. This may delay intra-DU serving cell change or inter-DU serving cell change using a L1/L2 measurements. This may also involve L3 signalling for every intra-DU serving cell change or inter-DU serving cell change using a L1/L2 measurements.

Also, the target cells becoming stronger than a threshold may be reported after multiple samples and time to trigger which is meant for stable radio condition for triggering handover. This may delay intra-DU serving cell change or inter-DU serving cell change using a L1/L2 measurements.

When the UE moves to a serving cell in the vicinity of a target cell for which the UE has not received measurement and reporting configuration from the CU-CP via RRC signaling (regardless whether the target cell is eligible for intra-DU serving cell change or inter-DU serving cell change using a L1/L2 measurements) there is no optimized way to ensure that CU-CP sends measurement and reporting configuration for the target cell in time to minimize disruption during intra-DU serving cell change or inter-DU serving cell change using a L1/L2 measurements. One may argue that this could be addressed by triggering L3 measurements, but there are multiple disadvantages including increased RRC signaling and F1 signaling from CU-CP to DU and the associated latency.

Intra-DU serving cell change and inter-DU serving cell change may be considered using a L1/L2 measurements.

One or more aspects of this disclosure provide a solution to one or more of the above issues.

A solution to reduce RRC Reconfigurations from a CU-CP to an UE is to send measurement and reporting configurations for all cells of a DU (maximum of 512 in current specifications) whenever a UE enters the DU. This certainly optimizes RRC signaling and F1 signaling. However, this implies that regardless of whether or not the UE receives receiving signals from all the cells of the DU, it may need to measure and report all the cells to the DU. This is very sub-optimal from the UE point of view.

The TCI state paradigm in NR Rel-15 is based on network configuring TCI states to the UE and then later activating which TCI state is used based on L1 measurements.

The UE always measure all TCI states so it can be ready to utilize them once MAC activation is sent.

The 3G soft handover is based on active, candidate and detected sets. The active set consists of the cells the UE is currently using. The candidate set consists of the cells the UE is currently configured to measure and report (in preparation for addition to the active set). The detected set consists of all cells that UE has otherwise detected (which still need to be explicitly added to candidate set or active set).

One or more aspects of this disclosure propose to have a set of L1 measurement and reporting configurations for one or more target cells. The set of L1 measurement and reporting configurations for one or more target cells is dormant and can be activated by a DU based on L1 or L2 layer signalling. When received, the UE may stores the set of L1 measurement and reporting configurations. The UE may measure and report the one or more target cells based on the L1 measurement and reporting configurations for one or more target cells until (explicitly or implicitly) indicated to by the DU. The UE may then measure and report the one or more target cells based on the L1 measurement and reporting configurations for one or more target cells as done currently (as of Rel-15) for L1 measurement and reporting configurations.

The activation of the set of L1 measurement and reporting configurations for the one or more target cells may be done either via explicit (L1 or L2) signalling (e.g. RLC/PDCP status packet data unit (PDU), MAC CE or downlink control information (DCI)) or via implicit conditions (e.g. UE monitors a condition that, upon triggering, causes UE to activate some or all of the set of L1 measurement and reporting configurations for one or more target cells.

The activation of the set of L1 measurement and reporting configurations for the one or more target cells may be done similarly as with existing L3 measurement and reporting configuration via implicit indication. The UE may start using the L1 measurement and reporting configuration for the target cell, upon target cell detection.

The DU may determine that the UE started using the L1 measurement and reporting configuration for the target cell based on report for the target cell.

The activation of the set of L1 measurement and reporting configurations for the one or more target cells may be done via explicit indication. The UE may use conditional RRCReconfiguration triggering to activate the L1 measurement and reporting configuration for a target cell. The conditional RRCReconfiguration triggering may cause the UE to send RRCReconfigurationComplete to the DU upon activating the L1 measurement and reporting configuration for a target cell.

The activation of the set of L1 measurement and reporting configurations for the one or more target cells may be done via a hybrid mechanism where some of the set of L1 measurement and reporting configurations for the one or more target cells are activated implicitly and others of the set of L1 measurement and reporting configurations for the one or more target cells are activated explicitly by the DU. One or more aspects of this disclosure proposes to provide one or more L1 measurement and reporting configurations for one or more target cells of a configured set (also referred as pre-configured set (PS)) of target cells in addition to one or more L1 measurement and reporting configurations for one or more target cells of an active set (AS) of target cells.

A CU CP may configure the one or more L1 measurement and reporting configurations for one or more target cells of a configured set of target cells in addition to the one or more L1 measurement and reporting configurations for one or more target cells of an active set of target cells.

The configured set of target cells may be eligible and configured for intra-DU serving cell change or inter-DU serving cell change using a L1/L2 measurements.

The one or more L1 measurement and reporting configurations for one or more target cells of the configured set of target cells may be provided to a UE. The UE may abstain from measuring and reporting the one or more target cells of the configured set of target cells based on the L1 measurement and reporting configurations for the one or more target cells of the configured set of target cells.

A DU may not reserve PUCH and/or PUSCH resources for reporting the one or more target cells of the configured set of target cells. The DU may not broadcast a CSI-RS for the one or more target cells of the configured set of target cells.

The CU-CP may send an indication to the DU if a target cell belongs to the configured set of target cells. The indication may be sent via F1 signalling (e.g. in a UE context setup or a UE context modification procedure).

The one or more L1 measurement and reporting configurations for one or more target cells of the configured set of target cells may be activated. That is, the one or more target cells of the configured set of target cells may be added to the one or more target cells of the active set of target cells.

The active set of target cells may be eligible and configured for intra-DU serving cell change or inter-DU serving cell change using a L1/L2 measurements.

The one or more L1 measurement and reporting configurations for one or more target cells of the active set of target cells may be provided to the UE. The UE may measure and report the one or more target cells of the active set of target cells based on the L1 measurement and reporting configurations for the one or more target cells of the active set of target cells.

A DU may reserve PUCH and/or PUSCH resources for reporting the one or more target cells of the active set of target cells. The DU may broadcast a CSI-RS for the one or more target cells of the active set of target cells.

The CU-CP may send an indication to the DU if a target cell belongs to the active set of target cells. The indication may be sent via F1 signalling (e.g. in a UE context setup or a UE context modification procedure).

The one or more L1 measurement and reporting configurations for one or more target cells of the active set of target cells may be deactivated. That is, the one or more target cells of the active set of target cells may be removed from the one or more target cells of the active set of target cells.

The one or more target cells of the active set of target cells may take over as serving cell or assisting cell for the UE.

TCU state configuration may comprise the one or more target cells of the active set of target cells.

It will be understood that a difference between the one or more target cells of the configured set of target cells and the one or more target cells of the active set of target cells is that the UE may abstain from measuring and reporting the one or more target cells of the configured set of target cells to the DU whereas the UE may measure and report the one or more target cells of the active set of target cells to the DU.

One or more aspects of this disclosure provide alternatives for activating measurement and reporting configurations for one or more target cells of the configured set of target cells. That is, one or more aspects of this disclosure provide alternatives for adding the one or more target cells of the configured set of target cells to the one or more target cells of the active set of target cells.

In the following one or more aspects of this disclosure are implemented in a distributed access node (AN) architecture (i.e. CU CP, CU UP and DU). However, it will be understood that these aspects are not limited to a distributed AN architecture. These aspects may be implemented in a non-distributed AN architecture (i.e. CU CP, CU CP and DU may be generalised to AN).

The configured set of target cells may be stored at the UE, the DU and/or CU CP.

The active set of target cells may be stored at the UE, the DU and/or CU CP.

The active set of target cells and the configured set of target cells may not be overlapping at least initially. A target cell in the configured set of target cells may or may not be added, permanently or temporarily, to the active set of target cells.

In a first alternative, a L1 measurement and reporting configuration may be configured by the CU CP for a serving cell and for each target cell eligible for intra-DU serving cell change or inter-DU serving cell change using a L1/L2 measurements.

Each L1 measurement and reporting configuration may comprise a measurement configuration and a reporting configuration.

Each reporting configuration may comprise a report activation state parameter. The parameter report activation state may be set to inactive for the L1 measurement and reporting configuration for a target cell of the configured set of target cells. The parameter report activation state may be set to active for the L1 measurement and reporting configuration for the serving cell or a target cell of the active set of target cells.

Alternatively, each reporting configuration may not comprise any report activation state parameter.

The CU CP may send the L1 measurement and reporting configurations for the serving cell and the target cells of the active set of target cells to the UE. The L1 measurement and reporting configurations may be sent in a RRCReconfiguration message.

The CU CP may send the L1 measurement and reporting configurations for the target cells of the configured set of target cells to the UE. The CU CP may send an activation condition to the UE. The L1 measurement and reporting configurations and/or the activation condition may be sent in a RRCReconfiguration message.

The L1 measurement and reporting configurations for the target cells of the configured set of target cells may be activated upon the activation condition being met. The activation condition may comprise one or more measurement ID. A measurement ID may identify a L3 event (e.g. A3 or A5 event). The L3 event may be similar to a L3 event for handover but with a smaller value for L3 filtering and/or a shorter time to trigger value.

For example, an activation condition may comprise a L3 measurement of a target cell exceeding a L3 measurement threshold. The activation condition may comprise a RSRP measurement, a RSRQ, a SINR measurement or a RSSI measurement exceeding a RSRP measurement threshold, a RSRQ measurement threshold, a SINR measurement threshold or a RSSI measurement threshold. The activation condition may comprise a received signal quality/strength measurement exceeding a received signal quality/strength threshold. The activation condition may comprise exceeding a threshold. The threshold may be a channel quality threshold, a received signal strength threshold or a threshold related to other above mentioned measurements.

As explained above, L3 measurements may comprise L1 measurements filtered at L3. L1 measurements may comprise CSI RS and/or SSB measurements. L1 measurements may comprise RSRP measurements, RSRQ measurements, SINR measurements or RSSI measurements.

When the activation condition is met for a target cell, the UE may send an indication to the DU that the activation condition is met for the target cell. The indication may comprise one or more measurement IDs. The UE may send the indication in a MAC control element (CE).

Three scenarios may be distinguished when the activation condition is met for a target cell.

In a first scenario (intra DU), the target cell is served by the DU and is part of the configured set of target cells.

The DU may reserve resources, such as PUCCH and/or PUSCH resources, for reporting the target cell. The DU may send an indication of the resources to the UE. The DU may send the indication in a MAC CE.

The DU may add the target cell to the active set of target cells. The DU may send an indication to the UE to add the target cell to the active set of target cells. The DU may send the indication in a MAC CE.

The L1 measurement and reporting configuration for the target cell may comprise a parameter report activation state set to inactive. The indication to add the target cell to the active set of target cells may comprise an indication to set the parameter report activation state to active.

The UE may add the target cell to the active set of target cells. The L1 measurement and reporting configuration for the target cell may comprise the parameter report activation state set to inactive. The UE may set the parameter report activation state of the L1 measurement and reporting configuration for the target cell to active.

Alternatively, the L1 measurement and reporting configuration for the target cell may not comprise any parameter report activation state set to inactive. The indication to add the target cell to the active set of target cells may not comprise any indication to set a parameter report activation state to active.

The UE may add the target cell to the active set of target cells. The UE may not set any parameter report activation state of the L1 measurement and reporting configuration for the target cell to active.

In a second scenario (intra DU), the target cell is served by the DU and is not part of the configured set of target cells.

The DU may reserve resources, such as PUCCH and/or PUSCH resources, for reporting the target cell. The DU may send an indication of the resources to the UE. The DU may send the indication in a MAC CE.

The DU may add the target cell to the active set of target cells. The DU may send an indication to the UE to add the target cell to the active set of target cells. The DU may send the indication in a MAC CE.

The DU may send a CellGroupConfig IE to the CU CP via F1 signalling. The CellGroupConfig IE may indicate that a UE context modification is required to trigger the CU CP to send a RRCReconfiguration to the UE with the L1 measurement and reporting configuration for the target cell. The parameter report activation state of L1 measurement and reporting configuration for the target cell may be set to active.

In a third scenario (inter DU or inter BS), the target cell is not served by the DU. The target cell may be served by another DU or by another BS.

The DU may send an indication to the UE to send a L3 report to the CU CP. Such L3 report may trigger the CU CP to configure a L1 measurement and reporting configuration for the target cell. The CU CP may send a RRCReconfiguration to the UE with the L1 measurement and reporting configuration for the target cell. The parameter report activation state of L1 measurement and reporting configuration for the target cell may be set to active.

In the first scenario, the second scenario and/or the third scenario, the DU may send an acknowledgement to the UE. The UE may send the acknowledgement in MAC CE. The UE may measure and report the target cell to the DU based on the L1 measurement and reporting configurations for the target cell.

In a second alternative, a L1 measurement and reporting configurations may be configured by the CU CP for a serving cell. Multiple L1 measurement and reporting configurations may be configured by the CU CP for different combinations of target cells eligible for intra-DU serving cell change or inter-DU serving cell change using a L1/L2 measurements.

The CU CP may send the L1 measurement and reporting configuration for the serving cell to the UE.

The CU CP may send the multiple L1 measurement and reporting configurations for different combinations of target cells to the UE.

The CU CP may send multiple activation conditions to the UE for the multiple L1 measurement and reporting configurations for different combinations of target cells. An activation condition may comprise one or more measurement IDs. A measurement ID may identify a L3 event. The activation condition in the second alternative may be different from the activation condition in the first alternative.

For example, an activation condition may comprise a L3 measurement of a target cell exceeding a L3 measurement threshold. The activation condition may comprise a RSRP measurement, a RSRQ, a SINR measurement or a RSSI measurement exceeding a RSRP measurement threshold, a RSRQ measurement threshold, a SINR measurement threshold or a RSSI measurement threshold. The activation condition may comprise a received signal quality/strength measurement exceeding a received signal quality/strength threshold. The activation condition may comprise exceeding a threshold. The threshold may be a channel quality threshold, a received signal strength threshold or a threshold related to other above mentioned measurements.

The CU CP may send the L1 measurement and reporting configuration for the serving cell, the multiple L1 measurement and reporting configurations for different combinations of target cells and/or the activation conditions to the UE in a RRCReconfiguration message. The RRCReconfiguration message may comprise a structure where each L1 measurement and reporting configuration for a combination of target cells is mapped to an activation condition and/or one or more PCIs.

The CU CP may send the L1 measurement and reporting configuration for the serving cell and/or the multiple L1 measurement and reporting configurations for different combinations of target cells and/or the activation conditions to the DU via F1 signalling.

When an activation condition is met for a combination of target cells, the UE may send an indication to the DU indicating that the activation condition is met for the combination of target cells. The indication may comprise one or more measurement IDs and/or PCIs. The UE may send the indication in a MAC CE.

The UE may receive an acknowledgement from the DU. The UE may receive the acknowledgement in a MAC CE.

The UE may measure and report the serving cell and the combination of target cells based on the L1 measurement and reporting configuration for the combination of target cells.

The DU may reserve resources, for example PUCCH and/or PUSCH resources, for reporting the serving cell and the multiple target cells. The DU may send an indication of the PUCCH and/or PUSCH resources to the UE. The DU may send an indication of the PUCCH and/or PUSCH resources in a MAC CE.

The DU may activate the L1 measurement and reporting configuration for the serving cell and the combination of multiple target cells. The DU may add the combination of target cells to the active set of target cells.

The DU may inform the CU CP on activation of the L1 measurement and reporting configuration for the serving cell and the combination of target cells. The DU may indicate that the activation condition is met for the multiple target cells. The CU CP may activate the L1 measurement and reporting configuration for the serving cell and the combination of target cells. The CU CP may add the serving cell and the combination of target cells to the active set of target cells.

The CU CP may apply the L1 measurement and reporting configuration for the serving cell and the combination of target cells and consider it as reference for any further signalling procedures towards the DU or the UE.

In the first alternative and/or the second alternative, the CU CP may additionally send a deactivation condition to the UE. The CU CP may additionally send a deactivation condition in a RRCReconfiguration message. A deactivation condition may comprise one or more measurement IDs. A measurement ID may identify a L3 event.

When the deactivation condition is met for the serving cell or one or more target cells, the UE may send an indication to the DU indicating that the deactivation condition is met for the serving cell and/or the one or more target cells. The indication may comprise one or more measurement IDs and/or one or more PCIs. The UE may send the indication in a MAC CE.

The UE may receive an acknowledgement from the DU. The UE may receive the acknowledgement in a MAC CE.

The UE may abstain from measuring and reporting the serving cell or the one or more target cells based on the L1 measurement and reporting configuration for the serving cell or one or more target cells.

The DU may release the resources, such as PUCCH and/or PUSCH resources, for reporting the serving cell or the one or more target cells. The DU may deactivate the L1 measurement and reporting configuration for the serving cell or the one or more target cells. The DU may remove the serving cell or the one or more target cells from the active set of target cells. The DU may add the serving cell or the one or more target cells to the configured set of target cells.

The DU may send an indication to the CU CP that the PUCCH and/or PUSCH resources for reporting the serving cell or the one or more target cells have been released. The CU CP may deactivate the L1 measurement and reporting configuration for the serving cell or the one or more target cells. The CU CP may remove the one or more target cells from the active set of target cells. The CU CP may add the serving cell or the one or more target cells to the configured set of target cells.

Such deactivation condition of L1 measurement and reporting configuration for the serving cell or one or more target cells is beneficial when the UE slowly moves out of the serving cell beams via inter-cell beam mobility.

The deactivation condition may comprise one or more measurement IDs. A measurement ID may identify a L3 event (e.g. A2).

For example, a deactivation condition may comprise a L3 measurement of the serving cell or a target cell going under a L3 measurement threshold. The deactivation condition may comprise a RSRP measurement, a RSRQ, a SINR measurement or a RSSI measurement going under a RSRP measurement threshold, a RSRQ measurement threshold, a SINR measurement threshold or a RSSI measurement threshold. The deactivation condition may comprise a received signal quality/strength measurement exceeding a received signal quality/strength threshold. The deactivation condition may comprise exceeding a threshold. The threshold may be a channel quality threshold, a received signal strength threshold or a threshold related to other above mentioned measurements.

In some implementations, the CU CP may receive an indication, from a serving DU, to send an indication to a non serving DU serving a target cell in the configured set to reserve resources for the UE when the target cell in the configured set is added to the active set. The CU CP may send an indication, to the non-serving DU, serving the target cell in the configured set to reserve resources for the UE when the target cell in the configured set is added to the active set.

Figure 7A:
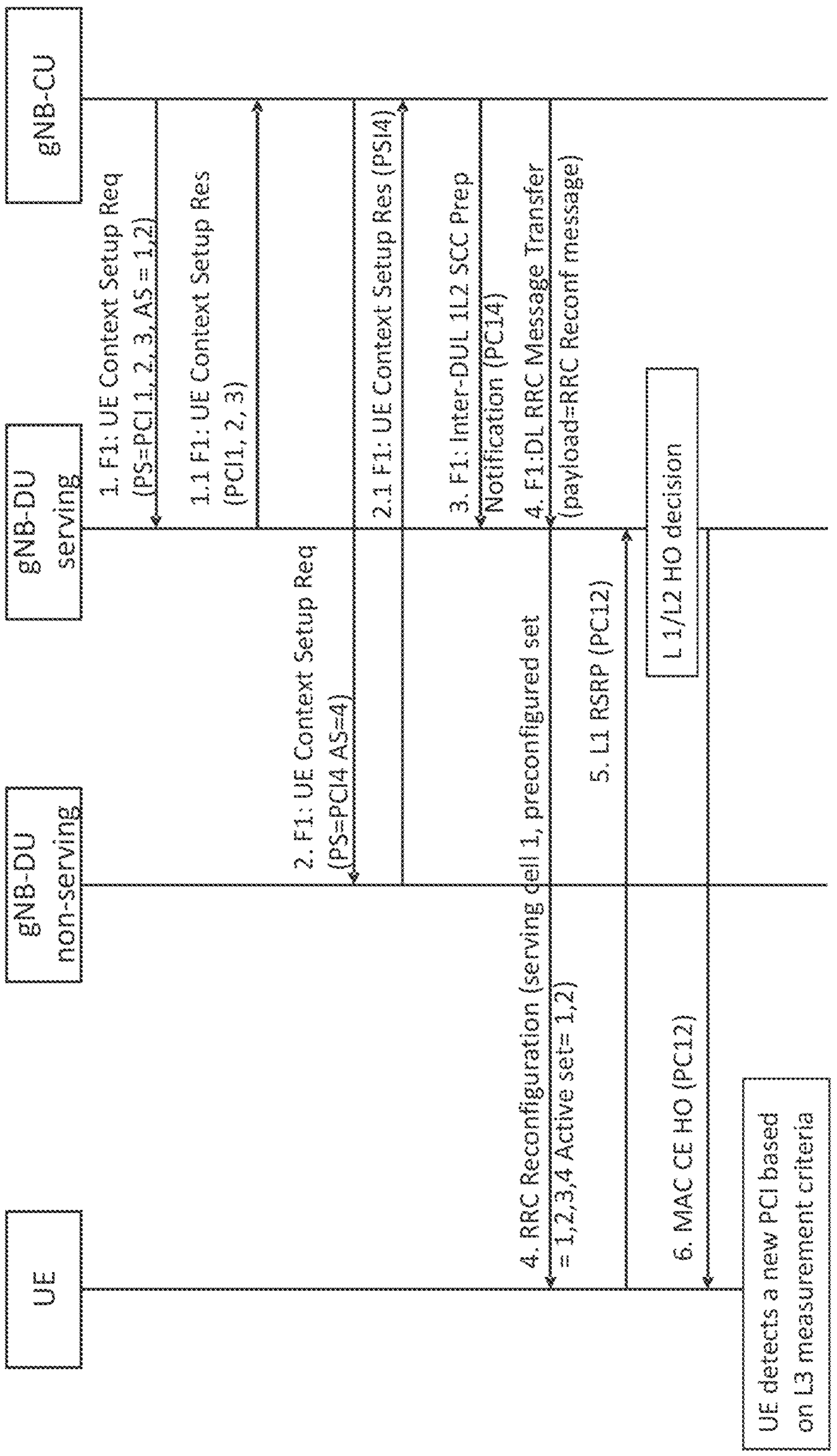
FIGS. 7*a* and 7*b* shows a signaling diagram of a process for measuring and reporting a target cell in a communication system.
Figure 7B:
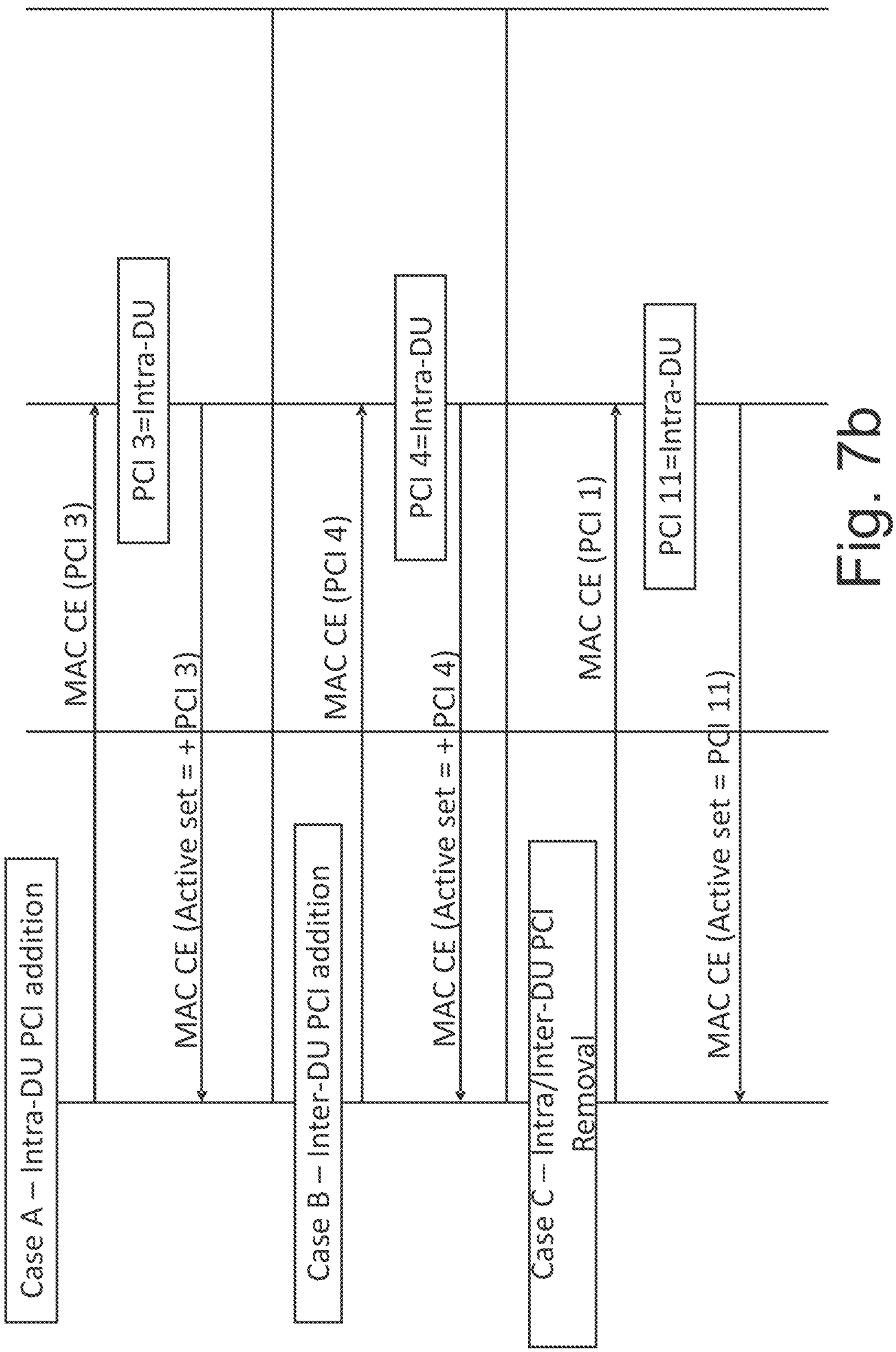

FIGS. 7*a* and 7*b* shows a signaling diagram of a process for measuring and reporting a target cell in a communication system according to the first alternative.

In step 1, a gNB CU may send a UE context setup request to a serving gNB DU via F1 signalling. The UE context setup request may indicate that a configured set of target cells comprises targets cells PCI1, PCI2 and PCI3 and an active set of target cells comprises target cells PCI1 and PCI2.

Here, the active set of target cells is included in the configured set of target cells. That is, the target cells in the active set of target cells are also in the configured set of target cells.

Alternatively, the active set of target cells may be excluded from the configured set of target cells. That is, the target cells in the active set of target cells may not also be in the configured set of target cells.

In step 1.1, the serving gNB DU may send a UE context setup response to the gNB CU via F1 signalling. The UE context setup response may indicate the target cells PCI1, PCI2 and PCI3.

In step 2, the gNB CU may send a UE context setup request to a non-serving gNB DU via F1 signalling. The UE context setup request may indicate that a configured set of target cells comprises a target cell PCI4 and an active set of target cells comprises the target cell PCI4.

In step 2.2, the non-serving gNB DU may send a UE context setup response to the gNB CU via F1 signalling. The UE context setup response may indicate the target cell PCI4.

In step 3, the gNB CU may send an inter-DU L1/L2 measurement based serving cell change preparation notification via F1 signalling. The inter-DU L1/L2 measurement based serving cell change preparation notification indicates the target cell PCI4.

In step 4, the gNB CU may send a downlink RRC message transfer to the serving gNB DU via F1 signalling. The gNB CU may send a downlink RRC message transfer comprises a RRCReconfiguration message as payload.

The RRCReconfiguration message may indicate that the serving cell is PCI1, that a configured set of target cells comprises targets cells PCI1, PCI2, PCI3 and PCI4 and an active set of target cells comprises target cells PCI1 and PCI2.

The RRCReconfiguration message may comprise a L1 measurement and reporting configuration for the serving cell. The RRCReconfiguration message may comprise a L1 measurement and reporting configuration for each target cell of the configured set of target cells. The report activation state parameter of the L1 measurement and reporting configurations for the target cells of the configured set of target cells is set to inactive.

The RRCReconfiguration message may comprise a L1 measurement and reporting configuration for each target cell of the active set of target cells. The report activation state parameter of L1 measurement and reporting configurations for the target cells of the active set of target cells is set to active.

The RRCReconfiguration message may comprise an activation condition and/or a deactivation condition.

In step 4, the serving gNB DU may transfer the RRCReconfiguration message to a UE.

The UE may measure and report target cells in the active set of target cells based on the L1 measurement and reporting configuration for the target cells.

The UE may abstain from measuring and report target cells in the configured set of target cells but not in the active set of target cells based on the L1 measurement and reporting configuration for the target cells.

In step 5, the UE may measure and report the target cell PCI2 to the serving gNB DU in a MAC CE. The report may comprise a L1 measurement (e.g. L1 RSRP). The serving gNB DU may decide to handover the UE from the serving cell PCI1 to the target cell PCI2 based on the report.

In set 6, the UE may receive an indication from the serving gNB DU to perform handover from the serving cell PCI1 to the target cell PCI2 in a MAC CE. The UE may perform handover from the serving cell PCI1 to the target cell PCI2 MAC CE.

In the following, different cases are contemplated to add a target cell to the active set of target cells or to remove a target cell from the active set of target cells.

In case A, the UE may determine that the activation condition is met for the target cell PCI3. The UE may send an indication to the serving gNB DU that the activation condition is met for the target cell PCI3 in a MAC CE. The indication may comprise one or more measurement IDs and/or the PCI3.

The serving gNB DU may determine that the target cell PCI3 is served by the serving DU and that the PCI3 is part of the configured set of target cells but not part of the active set of target cells. The serving gNB DU may reserve PUCCH and/or PUSCH resources for reporting the target cell PCI3. The serving gNB DU may send an indication of the PUCCH and/or PUSCH resources to the UE in a MAC CE.

The serving gNB DU may add the target cell PCI3 to the active set of target cells.

The serving gNB DU may send an indication to the UE to add the target cell PCI3 to the active set of target cells in a MAC CE. The UE may set the parameter report activation state of the L1 measurement and reporting configuration for the target cell PCI3 to active. The UE may measure and report the target cell PCI3 to the serving gNB DU based on the L1 measurement and reporting configurations for the target cell PCI3.

In case B, the UE may determine that the activation condition is met for the target cell PCI4. The UE may send an indication to the serving gNB DU that the activation condition is met for the target cell PCI4 in a MAC CE. The indication may comprise one or more measurement IDs and/or the PCI4.

The serving gNB DU may determine that the target cell PCI4 is not served by the DU. The serving gNB DU may send an indication to the UE to send a L3 report to the gNB CU. The L3 report comprise L3 measurement. Such L3 report may trigger the gNB CU to send a RRCReconfiguration to the UE with the L1 measurement and reporting configuration for the target cell PCI4.

The serving gNB DU may add the target cell PCI4 to the active set of target cells.

The serving gNB DU may send an indication to the UE to add the target cell PCI4 to the active set of target cells in a MAC CE.

The UE may add the target cell PCI4 to the active set of target cells. The UE may set the parameter report activation state of the L1 measurement and reporting configuration for the target cell PCI4 to active. The UE may measure and report the target cell PCI4 to the serving gNB DU based on the L1 measurement and reporting configurations for the target cell PCI4.

In case C, the UE may determine that the deactivation condition is met for the serving cell PCI1. The UE may send an indication to the serving gNB DU that the deactivation condition is met for the serving cell PCI1 in a MAC CE. The indication may comprise one or more measurement IDs and/or the PCI1.

The UE may receive an acknowledgement from the serving gNB DU in a MAC CE.

The UE may abstain from measuring and reporting the serving cell PCI1 based on the L1 measurement and reporting configuration for the serving cell PCI1.

The DU may release PUCCH and/or PUSCH resources for reporting the serving cell CPI1. The DU may deactivate the L1 measurement and reporting configuration for the serving cell PCI1. The DU may remove the serving cell PCI1 from the active set of target cells. The DU may maintain the serving cell PCI1 in the configured set of target cells.

Figure 8:
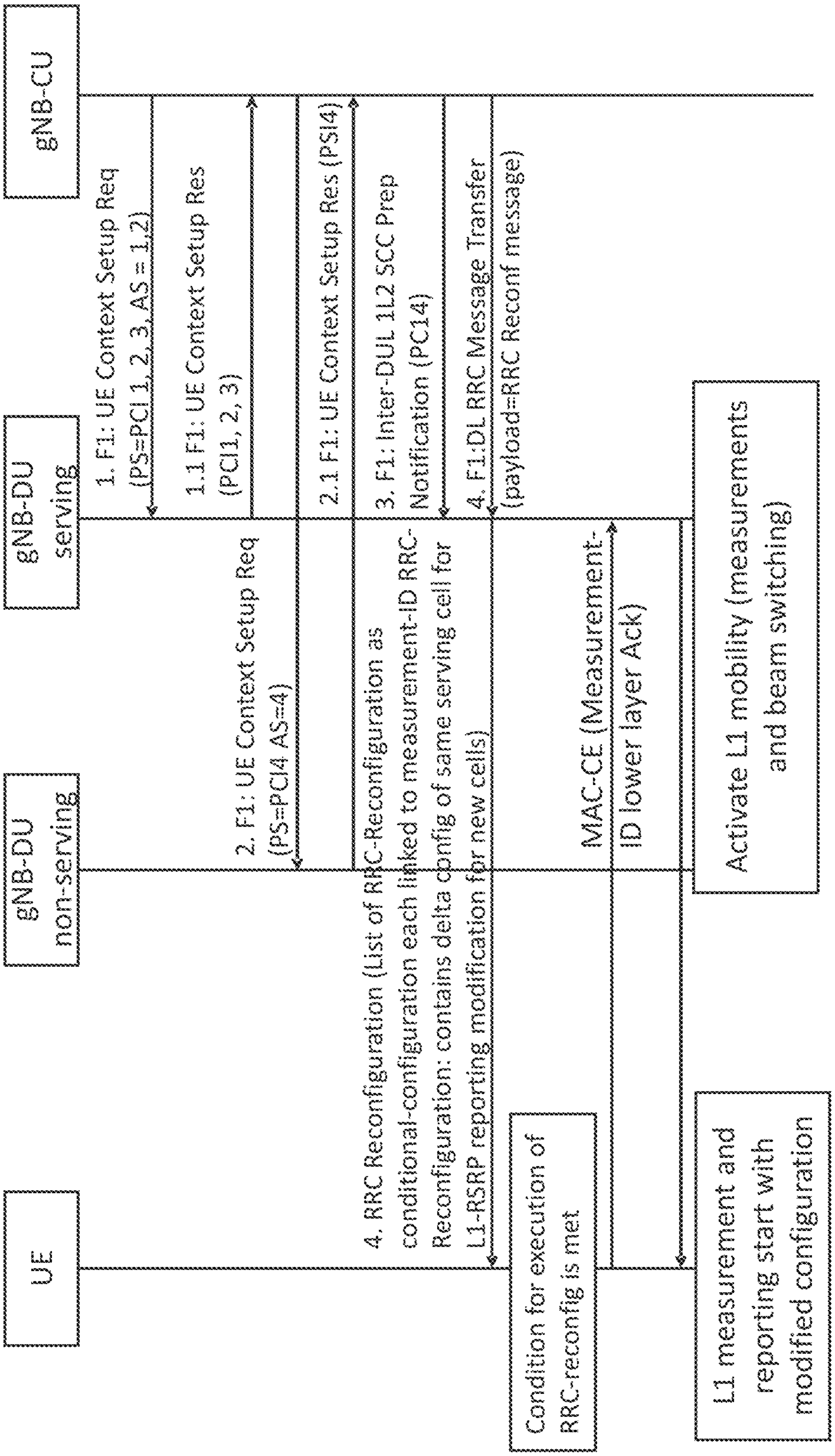
FIG. 8 shows a signaling diagram of another process for measuring and reporting a target cell in a communication system.

FIG. 8 shows a signaling diagram of another process for measuring and reporting a target cell in a communication system according to the second alternative.

In step 1, a gNB CU may send a UE context setup request to a serving gNB DU via F1 signalling. The UE context setup request may indicate that a configured set of target cells comprises targets cells PCI1, PCI2 and PCI3 and an active set of target cells comprises target cells PCI1 and PCI2.

In step 1.1, the serving gNB DU may send a UE context setup response to the gNB CU via F1 signalling. The UE context setup response may indicate the target cells PCI1, PCI2 and PCI3.

In step 2, the gNB CU may send a UE context setup request to a non-serving gNB DU via F1 signalling. The UE context setup request may indicate that a configured set of target cells comprises a target cell PCI4 and an active set of target cells comprises a target cell PCI4.

In step 2.2, the non-serving gNB DU may send a UE context setup response to the gNB CU via F1 signalling. The UE context setup response may indicate the target cell PCI4.

In step 3, the gNB CU may send an inter-DU L1/L2 measurement based serving cell change preparation notification to the gNB serving DU via F1 signalling. The inter-DU L1/L2 measurement based serving cell change preparation notification indicates the target cell PCI4.

In step 4, the gNB CU may send a downlink RRC message transfer to the serving gNB DU via F1 signalling. The gNB CU may send a downlink RRC message transfer comprises a RRCReconfiguration message as payload.

The RRCReconfiguration message may comprise multiple L1 measurement and reporting configurations for different combination of target cells PCI2, PCI3 or PCI4.

The RRCReconfiguration message may comprise multiple activation conditions for the multiple L1 measurement and reporting configurations for the different combination of target cells PCI2, PCI3 or PCI4.

In step 4, the serving gNB DU may send the RRCReconfiguration message to the UE.

The UE may determine that an activation condition may be met for a L1 measurement and reporting configuration for a combination of target cells PCI2, PCI3 or PCI4.

The UE may send an indication to the serving gNB DU that the activation condition is met for the combination of target cells PCI2, PCI3 or PCI4. The indication may comprise one or more measurement ID and/or a combination of PCIs.

The UE may receive an acknowledgement from the serving gNB DU.

The serving gNB DU and the non-serving gNB DU may activate mobility (measurements and beam switching).

The serving gNB DU may reserve PUCCH and/or PUSCH resources for reporting the combination of target cells. The serving gNB DU may send an indication of the PUCCH and/or PUSCH resources to the UE in a MAC CE.

The serving gNB DU may add the combination of target cells to the active set of target cells.

The serving gNB DU may send an indication to the UE to add the combination of target cells to the active set of target cells in a MAC CE. The UE may measure and report the target cell PCI3 to the serving gNB DU based on the L1 measurement and reporting configurations for the target cell PCI3.

FIG. 9 shows a block diagram of a method for measuring and reporting a target cell in a communication system performed by a UE.

In step 900, a UE may receive, from an AN (e.g. gNB), a first measurement and reporting configuration for at least one first cell of an active set and a second measurement and reporting configuration for at least one second cell of a configured set, wherein the at least one second cell is a target cell and not part of the active set.

In step 902, the UE may measure and report, to the AN, the at least one first cell based on the first measurement and reporting configuration.

In step 904, the UE may abstain from measuring and reporting, to the AN, the at least one second cell based on the second measurement and reporting configuration.

In step 906, the UE may send, to the AN, an indication that an activation condition is met for the at least one second cell.

In step 908, the UE may add the at least one second cell to the active set based on a confirmation indication from the access node.

In step 910, the UE may measure and report, to the AN, the at least one second cell based on the second measurement and reporting configuration.

The UE may receive, from the AN, the second measurement and reporting configuration for a second cell of the configured set, wherein the second measurement and reporting configuration indicates that a report activation state is to be set to inactive. The UE may abstain from measuring and reporting, to the AN, the second cell based on the second measurement and reporting configuration. The UE may send, to the AN, the indication that the activation condition is met for the second cell.

The UE may add the second cell to the active set based on a confirmation indication from the AN. The UE may measure and report, to the AN, the second cell based on the second measurement and reporting configuration.

The indication that the activation condition is met for the second cell may be sent in a MAC CE message.

The indication that the activation condition is met for the second cell may be sent to a DU of the AN in a MAC CE message.

The UE may receive, from the AN, at least one indication indicating that the report activation state is to be set to active and that resources for the second measurement and reporting configuration have been reserved by the AN. In response to receiving the at least one confirmation indication, the UE may measure and report, to the AN, the second cell based on the second measurement and reporting configuration using the resources.

The at least one indication that the report activation state is to be set to active and that resources have been reserved by the access node may be received in a MAC CE message.

The UE may determine that the activation condition is met for a third cell, wherein the third cell is served by a same DU of the AN serving the first cell and the at least one second cell, wherein the third cell is a target cell and is not part of the active set or the configured set. The UE may send, to the same DU of the AN, an indication that the condition is met for the third cell. The UE may receive, from the AN, a third measurement and reporting configuration for the third cell with a report activation state set to active and at least one indication that resources for the third measurement and reporting configuration have been reserved by the AN. The UE may measure and report, to the AN, the third cell based on the third measurement and reporting configuration using the resources.

The UE may determine that the activation condition is met for a fourth cell, wherein the fourth cell is a target cell and is not part of the active set or the configured set. The UE may send to the AN, an indication that the condition is met for the fourth cell. The UE may receive, from the AN, an indication to send, to the AN, a layer 3 report for the fourth cell.

The indication that the report activation state is to be set to active may be received in a MAC CE message and/or the indication to send, to the AN, a layer 3 report for the fourth cell may be received in a MAC CE message.

The UE may receive, from the AN, the second measurement and reporting configuration for a plurality of second cells of the configured set. The UE may abstain from measuring and reporting, to the AN, the plurality of second cells based on the second measurement and reporting configuration. The UE may send, to the AN, an indication that the activation condition is met and the second measurement and reporting configuration is applied for at least one of the plurality of second cells. The UE may add the at least one of the plurality of second cells to the active set based on a confirmation indication from the AN. The UE may measure and report, to the access node, the plurality of second cells based on the second measurement and reporting configuration.

The UE may receive, from the AN, the activation condition.

The activation condition may be received in a RRC reconfiguration message.

The activation condition may comprise at least one measurement identifiers identifying at least one layer 3 measurement events.

The at least one layer 3 measurement events may comprise a layer 3 measurement exceeding a layer 3 measurement threshold.

The activation condition may comprise a reference signal received power measurement, a reference signal received quality measurement, a signal to interference plus noise ratio measurement, a reference signal strength indicator measurement, a received signal quality measurement, a received signal strength measurement or a reference signal strength indicator measurement exceeding respectively a reference signal received power measurement threshold, a reference signal received quality measurement threshold, a signal to interference plus noise ratio measurement threshold, a received signal quality threshold, a received signal strength threshold or threshold.

At least one of the first measurement and reporting configuration, the second measurement and reporting configuration, the third measurement and reporting configuration and the fourth measurement and reporting configuration may be a layer 1 measurement and reporting configuration.

At least one of the first measurement and reporting configuration, the second measurement and reporting configuration, the third measurement and reporting configuration and the fourth measurement and reporting configuration may be a channel state information reference signal or a synchronisation signal block measurement and reporting configuration.

The UE may send, to the AN, an indication that a deactivation condition is met for the at least one first cell and/or the at least one second cell. The UE may remove the at least one first cell and/or the at least one second cell from the active set based on a confirmation indication from the access node. The UE may abstain from measuring and reporting, to the access node, the at least one first cells and/or the at least one second cell based on the first measurement and reporting configuration and/or the second measurement and reporting configuration.

The AN may comprise a distributed architecture.

The AN may serve a serving cell for the apparatus.

Figure 10:
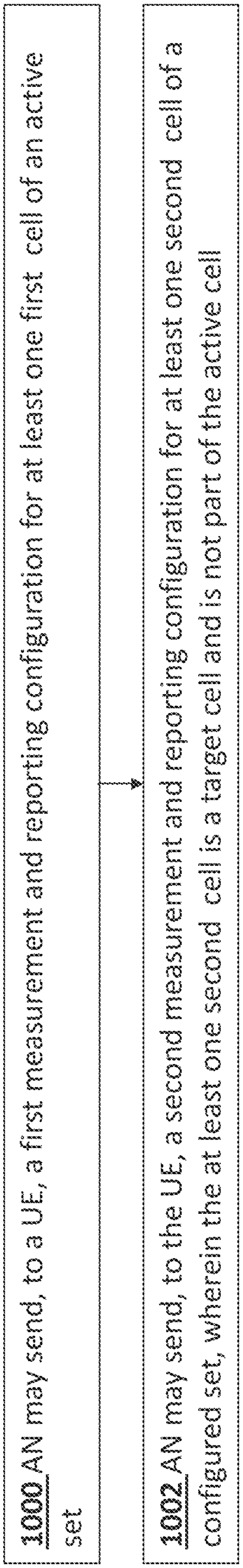
FIG. 10 shows a block diagram of a method for measuring and reporting a target cell in a communication system performed by an access node.

FIG. 10 shows a block diagram of a method for measuring and reporting a target cell in a communication system performed by an access node (e.g. gNB).

In step 1000, the AN (e.g. CU) may send, to a UE, a first measurement and reporting configuration for at least one first cell of an active set.

In step 1002, the AN (e.g. CU) may send, to the UE, a second measurement and reporting configuration for at least one second cell of a configured set, wherein the at least one second cell is a target cell and is not part of the active cell.

The AN (e.g. CU) may receive an indication, from a same DU of the AN (e.g. CU) serving the first cell and the at least one second cell, to send a third measurement and reporting configuration for a third cell served by the same DU, wherein the third cell is a target cell and is not part of the active set or the configured set. The AN (e.g. CU) may send the third measurement and reporting configuration for the third cell to the user equipment.

The AN (e.g. CU) may receive an indication, from a serving DU of the AN (e.g. CU), to send an indication to a DU of the AN (e.g. CU) serving a cell in the configured set to reserve resources for a measurement and reporting configuration for the UE when the cell in the configured set is added to the active set. The AN (e.g. CU) may send an indication, to the DU of the AN (e.g. CU), serving the cell in the configured set to reserve resources for the UE when the cell in the configured set is added to the active set.

The AN (e.g. CU) may receive, from the UE, a layer 3 report for a fourth cell, wherein the fourth cell is a target cell and is not part of the active set or the configured set. The AN (e.g. CU) may initiate preparation of a fourth measurement and reporting configuration with a DU serving the fourth cell. The AN (e.g. CU) may send the fourth measurement and reporting configuration for the fourth cell to the UE.

The AN (e.g. serving DU) may receive, from the UE, a report for at least one first cells of an active set based on a first measurement and reporting configuration. The AN (e.g. serving DU) may receive, from the UE, an indication that an activation condition is met for at least one second cell of a configured set, wherein the at least one second cell is a target cell and is not part of the active cell. The AN (e.g. serving DU) may send a confirmation indication to the UE. The AN (e.g. serving DU) may receive, from the UE, a report for the at least one second cell based on a second measurement and reporting configuration.

The AN (e.g. serving DU) may send, to the UE, an indication of resources for the at least one second measurement and reporting configuration reserved by the AN (e.g. serving DU). The AN (e.g. serving DU) may receive, from the UE, the report for the at least one second cell based on the second measurement and reporting configuration using the resources.

The AN (e.g. serving DU) may receive, from the user equipment, an indication that the activation condition is met for a third cell, wherein the third cell is a target cell and is not part of the configured set or the active set. The AN (e.g. serving DU) may reserve resources for a third measurement and reporting configuration and prepare the third measurement and reporting configuration for the third cell. The AN (e.g. serving DU) may send an indication, to a CU of the AN, that the third measurement and reporting configuration has to be sent to the UE for the third cell. The AN (e.g. serving DU) may receive, from the UE, a report for the third cell based on the third measurement and reporting configuration.

The AN (e.g. serving DU) may send, to the UE, an indication to send a layer 3 report for a fourth cell, wherein the fourth cell is a target cell and not part of the active set or the configured set.

Figure 11:
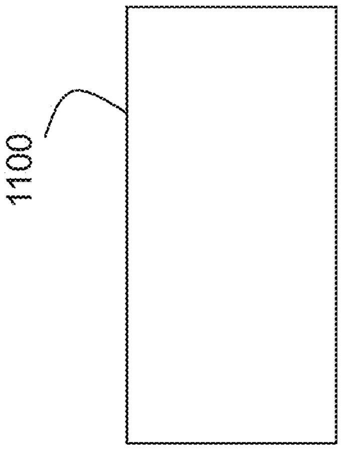
FIG. 11 shows a schematic representation of a non-volatile memory medium storing instructions which when executed by a processor allow a processor to perform one or more of the steps of the methods of FIGS. 9 to 10.

FIG. 11 shows a schematic representation of non-volatile memory media 1200 (storing instructions and/or parameters which when executed by a processor allow the processor to perform one or more of the steps of the methods of FIGS. 9 to 10.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 9 to 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising at least one processor and at least one memory including computer code for one or more programs, the at least one memory and the computer code configured, with the at least one processor, to cause the apparatus at least to:

receive, from an access node, a first measurement and reporting configuration for at least one first cell of an active set and a second measurement and reporting configuration for at least one second cell of a configured set, wherein the at least one second cell is a target cell and not part of the active set;

measure and report, to the access node, the at least one first cell based on the first measurement and reporting configuration;

abstain from measuring and reporting, to the access node, the at least one second cell based on the second measurement and reporting configuration;

send, to the access node, an indication that an activation condition is met for the at least one second cell;

add the at least one second cell to the active set based on a confirmation indication from the access node; and measure and report, to the access node, the at least one second cell added to the active set based on the second measurement and reporting configuration.

2. The apparatus of claim 1, wherein the second measurement and reporting configuration indicates that a report activation state is to be set to inactive;

abstain from measuring and reporting, to the access node, the second cell based on the second measurement and reporting configuration;

send, to the access node, the indication that the activation condition is met for the second cell;

add the second cell to the active set based on a confirmation indication from the access node; and measure and report, to the access node, the second cell based on the second measurement and reporting configuration.

3. The apparatus of claim 2, wherein the indication that the activation condition is met for the second cell is sent in a medium access control element message.

4. The apparatus of claim 3, wherein the indication that the activation condition is met for the second cell is sent to a distributed unit of the access node in a medium access control element message.

5. The apparatus of claim 2, wherein the at least one memory and the computer code are configured, with the at least one processor, to cause the apparatus at least to:

receive, from the access node, at least one indication indicating that the report activation state is to be set to active and that resources for the second measurement and reporting configuration have been reserved by the access node; and in response to receiving the at least one confirmation indication, measure and report, to the access node, the second cell based on the second measurement and reporting configuration using the resources.

6. The apparatus of claim 5, wherein the at least one indication that the report activation state is to be set to active and that resources have been reserved by the access node is received in a medium access control element message.

7. The apparatus of claim 2, wherein the at least one memory and the computer code are configured, with the at least one processor, to cause the apparatus at least to:

determine that the activation condition is met for a third cell, wherein the third cell is served by a same distributed unit of the access node serving the first cell and the at least one second cell, wherein the third cell is a target cell and is not part of the active set or the configured set; and send, to the same distributed unit of the access node, an indication that the activation condition is met for the third cell;

receive, from the access node, a third measurement and reporting configuration for the third cell with a report activation state set to active and at least one indication that resources for the third measurement and reporting configuration have been reserved by the access node; and measure and report, to the access node, the third cell based on the third measurement and reporting configuration using the resources.

8. The apparatus of claim 2, wherein the at least one memory and the computer code are configured, with the at least one processor, to cause the apparatus at least to:

determine that the activation condition is met for a fourth cell, wherein the fourth cell is a target cell and is not part of the active set or the configured set;

send to the access node, an indication that the activation condition is met for the fourth cell; and receive, from the access node, an indication to send, to the access node, a layer 3 report for the fourth cell.

9. The apparatus of claim 8, wherein the indication that the report activation state is to be set to active is received in a medium access control element message; and/or wherein the indication to send, to the access node, a layer 3 report for the fourth cell is received in a medium access control element message.

10. The apparatus of claim 1, wherein the at least one second cell comprises a plurality of second cells of the configured set.

11. The apparatus of any of claim 1, wherein the at least one memory and the computer code are configured, with the at least one processor, to cause the apparatus at least to:

receive, from the access node, the activation condition.

12. The apparatus of claim 11, wherein the activation condition is received in a radio resource control reconfiguration message.

13. The apparatus of claim 1, wherein the activation condition comprises at least one measurement identifier identifying at least one layer 3 measurement event.

14. The apparatus of claim 13, wherein the at least one layer 3 measurement event comprises a layer 3 measurement exceeding a layer 3 measurement threshold.

15. The apparatus of claim 13, wherein the activation condition comprises a reference signal received power measurement, a reference signal received quality measurement, a signal to interference plus noise ratio measurement, a reference signal strength indicator measurement, a received signal quality measurement, a received signal strength measurement or a reference signal strength indicator measurement exceeding respectively a reference signal received power measurement threshold, a reference signal received quality measurement threshold, a signal to interference plus noise ratio measurement threshold, a received signal quality threshold, a received signal strength threshold or reference signal strength indicator threshold.

16. The apparatus of claim 1, wherein at least one of the first measurement and reporting configuration and the second measurement and reporting configuration is a layer 1 measurement and reporting configuration.

17. The apparatus of claim 16, wherein at least one of the first measurement and reporting configuration and the second measurement and reporting configuration is a channel state information reference signal or a synchronisation signal block measurement and reporting configuration.

18. The apparatus of claim 1, wherein the at least one memory and the computer code are configured, with the at least one processor, to cause the apparatus at least to:

send, to the access node, an indication that a deactivation condition is met for the at least one first cell and/or the at least one second cell;

remove the at least one first cell and/or the at least one second cell from the active set based on a confirmation indication from the access node; and abstain from measuring and reporting, to the access node, the at least one first cells and/or the at least one second cell based on the first measurement and reporting configuration and/or the second measurement and reporting configuration.

19. The apparatus of claim 1, wherein at least one of:

the apparatus is a user equipment; or the access node comprises a distributed architecture; or the access node comprises a gNodeB; or the access node serves a serving cell for the apparatus.

* * * * *